United States Patent [19]

Hu et al.

[11] Patent Number: 5,748,188
[45] Date of Patent: May 5, 1998

[54] HYPERTEXT MARKUP LANGUAGE (HTML) EXTENSIONS FOR GRAPHICAL REPORTING OVER AN INTERNET

[75] Inventors: Yih-Shiuan Hu, Alpharetta; Tejwansh S. Anand, Roswell, both of Ga.

[73] Assignee: NCR Corporation, Dayton, Ohio

[21] Appl. No.: 742,003

[22] Filed: Oct. 31, 1996

Related U.S. Application Data

[63] Continuation-in-part of Ser. No. 542,266, Oct. 12, 1995.
[51] Int. Cl.6 .................................................. G06F 15/00
[52] U.S. Cl. ............... 345/326; 395/200.03; 395/200.36; 707/101; 707/104
[58] Field of Search .................................. 707/501, 513, 707/515, 517, 520, 522, 104, 101, 102, 204; 395/200.3, 200.33, 200.36, 200.48, 200.49, 200.68, 200.76; 345/326

[56] References Cited

U.S. PATENT DOCUMENTS

| | | | |
|---|---|---|---|
| 5,088,052 | 2/1992 | Spielman et al. | 345/346 |
| 5,355,472 | 10/1994 | Lewis | 395/500 |
| 5,404,506 | 4/1995 | Fujisawa et al. | 707/4 |
| 5,414,838 | 5/1995 | Kolton et al. | 707/104 |
| 5,455,945 | 10/1995 | VanderDrift | 707/2 |
| 5,471,611 | 11/1995 | McGregor | 395/51 |
| 5,537,590 | 7/1996 | Amado | 395/50 |
| 5,544,298 | 8/1996 | Kanavy et al. | 345/342 |

OTHER PUBLICATIONS

Korth and Silberschatz, "Database System Concepts" 2/E, McGraw–Hill Inc., pp. 97–98.

*Primary Examiner*—Matthew M. Kim
*Assistant Examiner*—Ba Huynh
*Attorney, Agent, or Firm*—Gregory J. Kirsch

[57] ABSTRACT

A hypertext data processing system wherein graphical data is sent from a server to a client computer using extensions to the Hypertext Markup Language (HTML). The client computer parses the graphical data and formulates an object representative of the graph to display. The object is passed to a graph server which displays the graph.

6 Claims, 28 Drawing Sheets

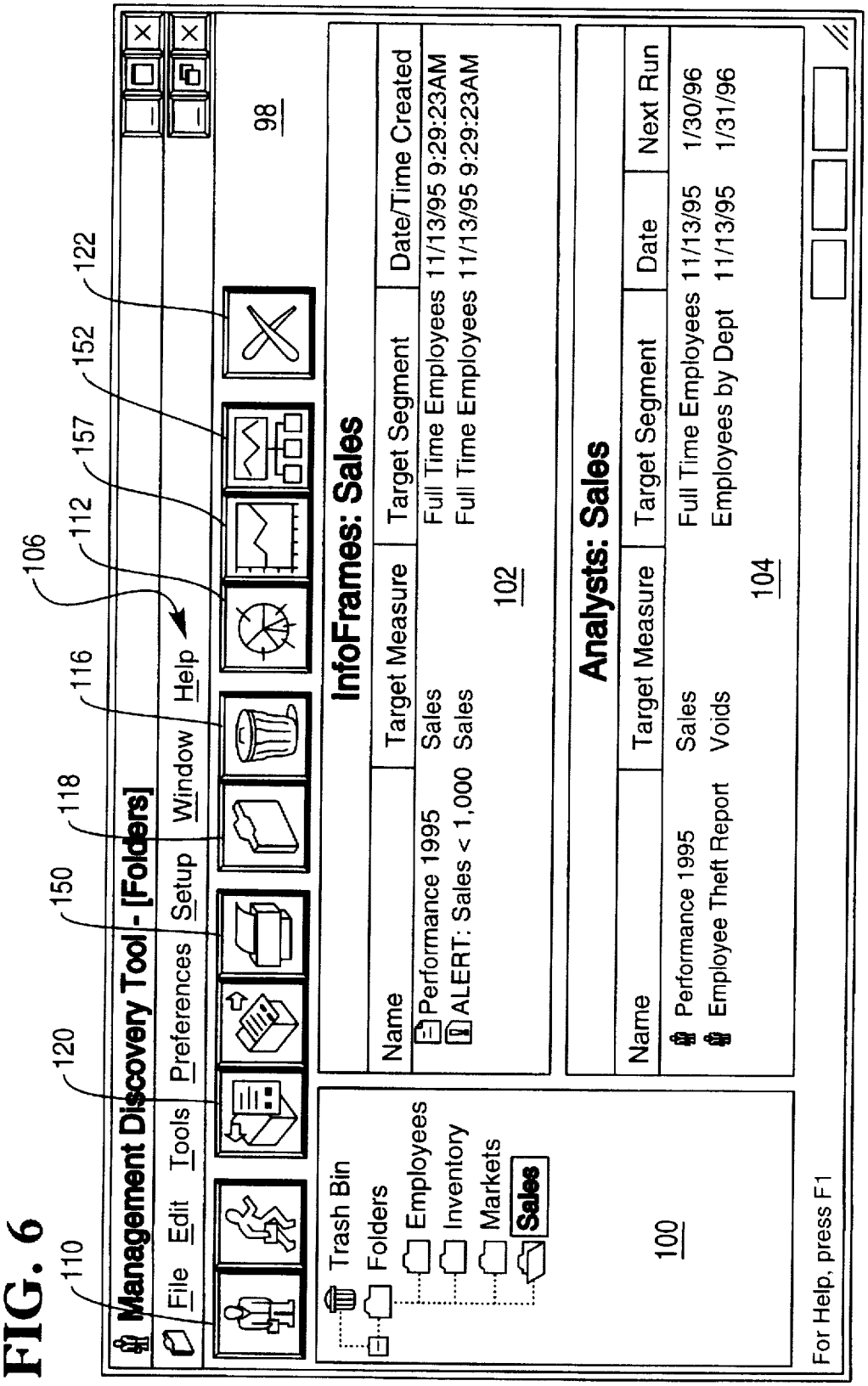

FIG. 7A

Folder Name: Analyst Name

130

Selections:
No selections have been made.

Analyst Name, Analysis Type & Measure(s)

Analyst Name:

Type of Analysis:

Change Analysis

Compare a measure or measures across two time periods.

Measure(s) to be analyzed:

Target Measure:

(none)

Additional Measure(s):

Product Share
Market Share
Number of Items Stocked per Store
Sales Volume
Everyday Number of Stores
Regular Number of Stores Help  Cancel  < Back  Next >  Run Now  Save  Save As

FIG. 7C

Employees:

Selections:
No selections have been made.

130

Time Period Considered

Choose the time period the analyst will consider in the report (e.g. 1 week, year to date).

Type of Year Used: [Calendar Year ⇩]

Base Period:
⦿ _ to date
○ Previous _
○ Specific Period [Quarter ⇩] to date
○ Specific Dates Because you chose to perform a Change Analysis, choose a comparison time period.

Comparison Period: [ ⇩ ]

Help | Cancel | < Back | Next > | Run Now | Save | Save As

FIG. 7D

Employees:

Selections:
No selections have been made.

130

Schedule and Trigger Option

If you want this analyst to run on a schedule (e.g., every week), fill in the schedule.

Schedule
☐ Enable Schedule

Report every  1 ▲▼  week  for  1 ▲▼  month ▲▼

Start on  10/21/96 ▲▼

Would you like set a trigger so that this analyst will run if a measure changes in a certain way (e.g., Revenue > $1,000,000)?

⦿ No   ◯ Yes

| Help | Cancel | < Back | Next > | Run Now | Save | Save As |

FIG. 8B

Edit Segment — 132

Segment Name: Middle Income N.D. Residents

Definition Builder:

Attribute | Operator | Value(s)

Segment Definition:

City is in list: Bismarck, Fargo, Grand Forks, Minot
Age is greater than 20
Income is between 20,000 and 120,000

⦿ Private Segment
○ Public Segment

[Help]  [Save]  [Close]

[Delete Line]  [Delete All]

HYPERTEXT MARKUP LANGUAGE (HTML) EXTENSIONS FOR GRAPHICAL REPORTING OVER AN INTERNET

CROSS-REFERENCE TO RELATED APPLICATIONS

This patent application is a continuation-in-part of co-pending U.S. patent application Ser. No. 08/542,266, filed Oct. 12, 1995, and entitled "System and Method For Generating Reports From a Computer Database". This patent application is also related to co-pending U.S. patent application Ser. No. 08/742,007, filed Oct. 31, 1996, and entitled "System and Method For Segmenting a Database Based Upon Data Attributes", and Ser. No. 08/742,006, filed Oct. 31, 1996, and entitled "System And Method For Performing Intelligent Analysis Of A Computer Database".

BACKGROUND OF THE INVENTION

1. Field of the Invention

This invention relates to a hypertext data processing system wherein graphical data is transmitted from a server computer to a client computer and displayed to a user.

2. Description of the Prior Art

Hypertext is a term used to describe a particular organization of information within a data processing system and its presentation to the user. Information is linked from a wide variety of sources to provide the user with the ability to explore a particular topic. Hypertext systems use a large number of units of text and other types of data such as image information, graphical information, video information or sound information which can vary in size. A collection of such units of information is termed a hypertext document.

Each of the different units is essentially self-contained but may contain references to other units. The references are made explicit in the form of "links". A link is a user-activated control. It causes the particular unit which is the link target to be displayed. Usually, hypertext systems are window based and the information to be displayed appears in a new window.

When the user activates a link to a graph, the graphical information is sent to the user in the form of a bit map. Since bit maps represent a picture of the complete graph, the usual size of a bit map is large. Consequently the bandwidth and storage used to send and receive bit maps must accommodate such large files.

Therefore, there is a need in the art for a system and method of sending graphical information of a hypertext document without sending the complete bit map of the graphical information to be displayed.

SUMMARY OF THE INVENTION

A system and method of sending graphical information of a hypertext document. The graphical information is sent using tag extensions of the HyperText Markup Language (HTML). A group of tags their corresponding attributes and graph data make up a graph element representative of the graph to be displayed. A server computer formulates the graph elements and sends them to a client computer via a network. The client computer parses the graph elements into the graph attributes and graph data and creates an object to pass to the graph server which resides in the client computer. The graph server displays the object representative of the graph.

BRIEF DESCRIPTION OF THE DRAWINGS

FIGS. 6–12 are views of a tool for creating reports which employs a graphic user interface;

DETAILED DESCRIPTION OF THE INVENTION

1. Overview of Basic Invention

Figure 1:
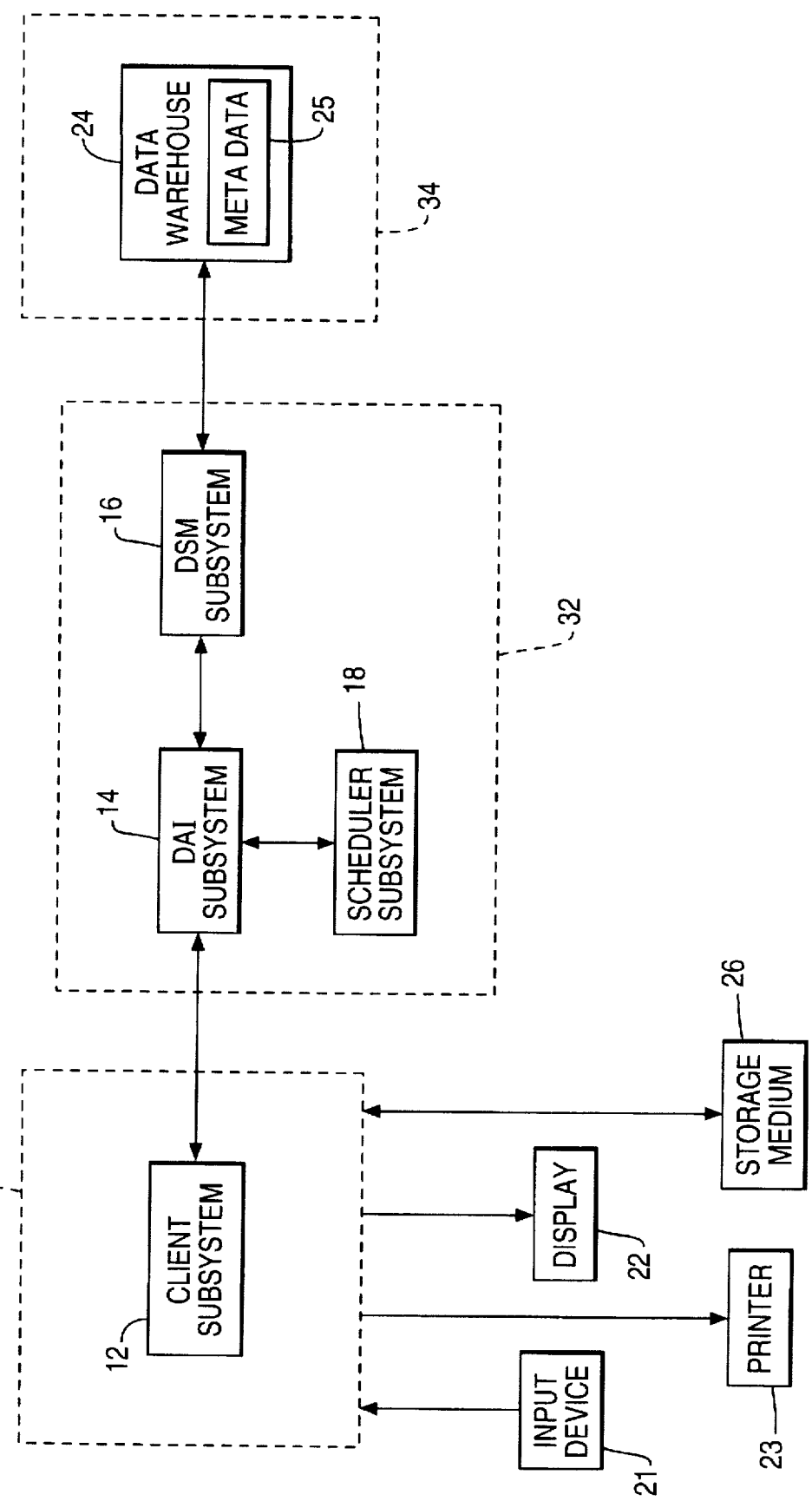
FIG. 1 is a block diagram of the system of the present invention.

Referring now to FIG. 1, system 10 includes four major subsystems: client subsystem 12, data abstraction intelligence (DAI) subsystem 14, data and schema manipulation (DSM) subsystem 16, and scheduler subsystem 18.

In connection with the description of system 10, the following definitions are provided:

An Alert Condition is a user-defined condition or set of conditions that when satisfied returns an Alert Message. For instance, an Alert Condition may be defined so that when the inventory of brand A shirts drops below 200 units for a given week, system 10 produces an Alert Message, InfoFrame or runs another analyst.

An Alert Message is a message that notifies the user that an Alert Condition has been satisfied. From an Alert Message the user can select the corresponding InfoFrame to be run. An example of an Alert Message would be "Alert: the inventory of brand A shirts is below 200."

An Alert InfoFrame is a type of InfoFrame that describes an Alert Message in detail. The Alert InfoFrame has a description of what happened, when, and probable reasons why it occurred.

An Analyst specifies an event in the data which must trigger an Alert; or specifies the type of analysis and the business measures and segments to be reported on in an InfoFrame, and optionally the schedule on which this InfoFrame is to be generated or the event in the data which must trigger the InfoFrame.

An attribute is a characteristic or feature of an entity represented in the warehouse. For example, Color, Manufacturer, or Size are all attributes of the product category of Clothing.

An attribute restriction is an expression that restricts the value that attribute can have. For example, in "Price is less than $10.00", the "less than $10.00" is a restriction on the Prices attribute. Another example might be: "Woman's Clothing or Men's Clothing" is a restriction on the Department Attribute. A single attribute value, like "Blue" or "Men's Clothing", is also an attribute restriction.

A specific entity (like a product) in the data warehouse is represented as a set of attributes and values. For example, the product "Perry Ellis men's shirt, size 42, color blue", might be represented as "Product: Department: Men's Clothing; Manufacturer: Perry Ellis; Size: 42; Color: blue". These values are members of a specific domain for each attribute (see below).

Business Indicators are classifications across Business Concepts that are usually related to numerical values (e.g. Sales Volume, Inventory, Price). Business indicators have methods and formulae that pertain to their computation (e.g. Total Sales) and causal associations between Business Indicators (e.g. If Price increases Sales Volume should decrease). Within a Business Indicator, segments can be defined which describe a specific group of Business Indicators of interest (e.g. Senior Customer, Company A Products).

A Change Analysis Report is a compound document describing Business Indicators over two time periods. Within system 10, one can specify two periods of time and see the difference of a chosen Business Indicator for that period (e.g., How did this year's sales of textiles compare to last years sales?) Change Analysis Reports can report results for a day, week, month, quarter, year, or other defined period.

A Comparison Analysis InfoFrame is a type of InfoFrame helps a business user compare the value of two Business Indicators across the same time period or compare the value of the same Business Indicator across two sibling segments across the same time period.

Compound Business Indicators are user-defined Business Indicators created by combining primitive Business Indicators with arithmetic and set operations.

A Data Warehouse is a very large collection of data that is housed in one or more databases. These databases usually reside on database server computers and can be either in one location or distributed geographically.

A Dimension defines the high-level categories of entities. For example, in a Retail domain, the dimensions might be: Product, Market, and Time (Time is a universal dimension applicable to any domain). A dimension has associated with a set of attributes that can be used to describe its entities; for example, Brand, Manufacturer and Size describe the dimensions of a product.

Every attribute has an implicit or explicit domain of values. For example, the domain of values for the Department attribute is an encoding of the legitimate departments for the enterprise, and the domain of values for the Size attribute is a non-zero number representing the size in specified units.

A Drill Down Heuristic specifies some relation between the measure values of the segments of a free attribute of a segment which must be reported to the user.

End Users are users for which system 10 is specifically designed. End users typically have knowledge of a business' operations and for this example have used Microsoft Windows (Windows 3.1, Windows NT & Windows 95, etc.).

End users typically do not have expertise in SQL code generation or the specific data structures of the databases they want to access.

Enterprise Information Factory (EIF) is a commercial software package that allows typical business users to access their data warehouse data. The data warehouse is essentially a passive environment that usually requires the use of SQL code and knowledge about the structure of the database to access data. The EIF differs from the data warehouse by providing a foundation for providing tools to allow users without SQL or database knowledge to get data out of their databases.

An Exception Analyst is specifically an Analyst which runs regularly to test for a trigger condition, and which returns an Alert or a Report when the trigger condition occurs.

If the domain of an attribute is a finite set (like Department above), it is called a finite domain. The alternative is an infinite or continuous domain, like Price.

A Free Attribute is an attribute of a segment which has not been restricted to define that segment. Color, Cost, and Weight might all be free attributes of the segment "Expensive Shirts"

A Heuristic Rule specifies some condition of data, some relation between the segment measure values found by an analyst, that should be reported to the user in the completed InfoFrame.

HyperText Markup Language (HTML) is an emerging standard format for software documents that allows for the inclusion of hyperlinks and graphics (pictures, graphs, tables) in text documents. A hyperlink is a "hot" area in the document (usually text in a different color than the surrounding text), that when clicked on, shows another document that is related or linked to the original HTML document.

A Knowledge Worker is typically a person familiar with SQL, who knows the structure of the Data Warehouse and who has an analytical background. In addition, the Knowledge Worker may use statistical and data analysis packages and data modeling tools.

Managament Discovery Tool (MDT) referes to the overall system of the present invention.

Metadata is the collection of information about the end user's particular business, and may be one of three types: core, public or private. After installation this information is stored in the end user's database and is used to tailor reports to the end user's particular business needs. Metadata includes, but is not limited to, Business Concepts, Business Indicators, Segments, Attributes, Attribute Values and Measure Relationships.

The core set of metadata is typically set up at installation by professional services personnel and the MDT Administrator. Core metadata consists of Dimensions, Attributes, Basic Measures, Segments and Year definitions.

Public metadata is only changeable by the MDT Administrator and Knowledge Worker user types and is defined and modified after installation. Public metadata includes Public Composite Measures, Public Measure Relationships and Public Segments.

Private metadata belongs to each user and is only changeable by the end user (Business/executive user) user type. Private metadata includes Private Composite Measures, Private Measure Relationships and Private Segments.

If an attribute has a finite domain, the Natural Partition is the partition where each segment corresponds to each element of the domain. For example, the natural partition of the Department attribute is the set of segments "Men's Clothing", "Woman's Clothing", etc.

Object Linking and Embedding (OLE) is a computer format that allows objects (e.g., graphs, tables) in computer documents to, when double clicked on, bring up the software application that created the object (graph, table, document).

If the user-defined segments for a given partition do not cover the domain, then an "Other" segment will stand for the rest of the partition.

A partition is an implicit or explicit division of the dimension by the restriction of a single attribute. For example, of one takes the Price attribute, and the "less than $10.00" restriction, this defines a partition of products into two sets or segments: those products with Price less than ten dollars, and those products with Price greater to or equal to ten dollars. Note that the sets or segments of a partition must cover the original set and not overlap, i.e., "Price <$10.00" and "Price <$15.00" do not define a partition.

Primitive Business Indicators are Business Indicators that are directly mappable to data in the data warehouse. They are set up during installation of the present invention and are not changeable by the end user.

Reports or InfoFrames are compound documents that display data from a database in text and graphics (e.g., graphs, tables). Reports are the result of running a InfoFrame Definition. InfoFrames may be in the HTML format and may be OLE 2.0 compliant.

A Restricted Attribute is an attribute of a segment which has be restricted to defined the segment. Product and Price might be the restricted attributes of "Expensive Shirts".

Segments are user-defined groups that are defined within a Business Concept having a meaningful attribute or attributes in common. For instance, the segment "Senior Customers" might be those customers whose age is greater than 65 years.

A segment is one part of a partition. Actually, a segment is a subset of data defined by restrictions on one or several attributes. If a segment is defined by several attributes, it can be part of several partitions, one for each restricted attribute (as shown shortly. This means that, given a segment in isolation, one cannot determine which partition it "should" belong to, and thus, one cannot determine its natural parents in the hierarchy).

A set of segments forms a segment hierarchy under the subset relation, with a root that is the "top-level segment", which contains all of the members of the dimension.

InfoFrame Definitions are System Templates that have been customized to include particular Business Concepts, Business Indicators, Time Intervals, Analysis Type, and segments. InfoFrame Definitions can be immediately "run" to produce a "InfoFrame", saved to be run later, saved and scheduled to be run later, or triggered by another analyst.

Structured Query Language (SQL) is a structured language for viewing the contents of a relational database.

Summarization InfoFrame is a type of InfoFrame that shows a roll-up or summarization of a specified Business Indicator across one or more specified segments. By selecting a particular Business Indicator in this report a InfoFrame showing the "winners" and "losers" for the specified period can be automatically produced.

System Administrators (MDT Administrators, or MDTA) are those users of system 10 who have an intimate knowledge of the databases and data structures of an organization. Often the System Administrator has the title of "database administrator" (DBA).

A Text Generation Rule specifies the text that must be inserted into an InfoFrame when the some heuristic rule is satisfied.

A Trend Analysis InfoFrame is a type of InfoFrame that, when defined, shows the trend for a specific Business Indicator or indicators over a specified period of time. This analysis can aid in forecasting the future by identifying patterns in past activities.

Client subsystem 12 is a single application program which has a graphical user interface (GUI) 40 and which allows a user to select and specify parameters for InfoFrames, view InfoFrames, print InfoFrames, and save InfoFrames. Finally, the user can define Composite Business Indicators and Segments, create Analysts, define Measure Relationships, or modify the schedule of Analysts.

DAI subsystem 14 provides intelligent middleware for translating graphical user requests, selecting system templates, manipulating data views, and generating dimensional queries for retrieving data from data warehouse 24. It also contains rules for choosing default parameters, for choosing layout and display formats, and for generating text from data. DAI subsystem 14 is responsible for instantiating user selected InfoFrames and managing several kinds of metadata 25 used in this instantiation. This metadata 25 represents Business Concepts and Business Indicators that provide a customizable "dimensionalization" of the relational data in data warehouse 24. DAI subsystem 14 also processes updates to this metadata 25 that originate in client subsystem 12 and handles several other kinds of user updates, primarily by passing them to DSM subsystem 16.

DSM subsystem 16 reads schema from data warehouse 24, creates data views, and creates a mapping between the two. It also uses that mapping to translate the Dimensional Queries received from DAI subsystem 14 into SQL and package and return the results.

Scheduler subsystem 18 is responsible for starting Analysts which are to run at a scheduled time or on a regulare schedule; or Exception Analsysts which must regularly test for a trigger condition in the database. When the requested time interval occurs, the Scheduler starts up, requests a list of scheduled InfoFrame Requests from DAI subsystem 14. From those lists, scheduler subsystem 18 determines which should be run during the current time interval and sends those requests to DAI subsystem 14 as if they were sent by client subsystem 12.

Thus, system 10 is implemented as a three-tier architecture. Client computer 30 executes client subsystem 12. Client computer 30 preferably executes Windows NT, or Windows 95, although other operating systems are also envisioned by the present invention. Client subsystem 12 (FIGS. 6-12) is suitable for use with these operating systems. Display 22 and input device 21 allow a user to view GUI 40 and enter choices of metadata 25 used in creating Analysts. Input device 21 may be a keyboard, mouse, or other pointing device. Printer 23 allows a user to print a InfoFrame. Storage medium 26 allows a user to store an InfoFrame or Alert Message.

Server computer 32 executes DAI subsystem 14, DSM subsystem 16, and scheduler subsystem 18. These three subsystems combine to satisfy user requests from client subsystem 12 using information from data warehouse 24. Server computer 32 is preferably a multi-processor computer and executes the UNIX operating system or Windows NT, although other computer and operating system configurations are also envisioned by the present invention.

Client and server computers 30 and 32 are preferably coupled asynchronously for report requests; all other requests are satisfied synchronously. Communication between client and server computers 30 and 32 is preferably through transmission control protocol/internet protocol (TCP/IP), although other transmission protocols are also envisioned by the present invention.

Database computer 34 includes one or more storage media 36 containing data warehouse 24. Database computer 34 is preferably a massively parallel processor computer and executes the UNIX operating system or Windows NT, although other computer and operating system configurations are also envisioned by the present invention. Data warehouse 24 is suited to run on any computer which supports an Open Database Connect (ODBC) interface to data warehouse 24. Communication between server computer 32 and database computer 34 is preferably via ODBC, although other database interfaces are also envisioned by the present invention.

Figure 2:
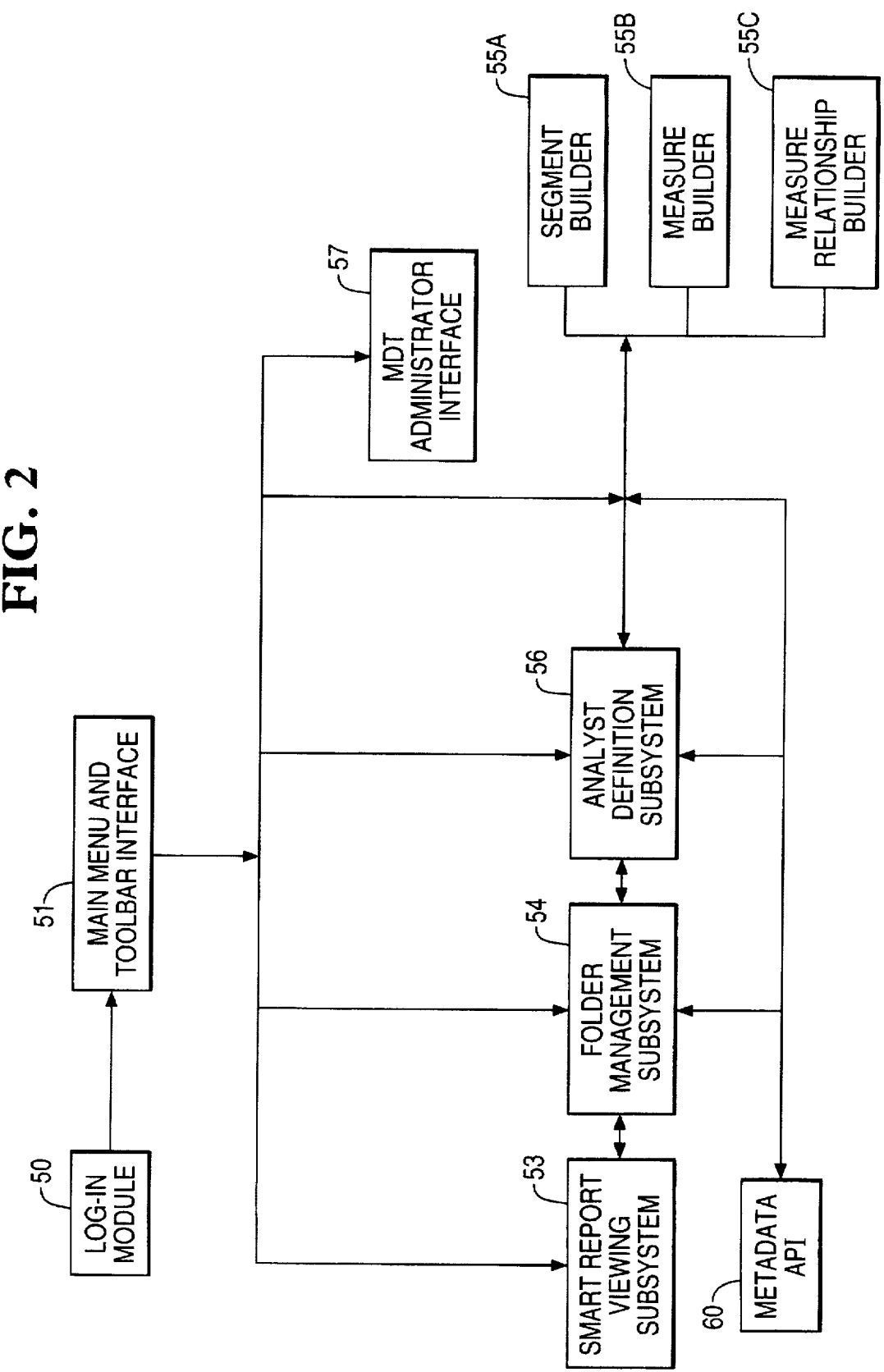
FIG. 2 is a block diagram of a client subsystem within the system of FIG. 1.

Turning now to FIG. 2, client subsystem 12 is an application program which gives a user control over system 10 and is suitable for execution on top of the Windows NT, or Windows 95 operating systems. Client subsystem 12 includes log-in module 50, folder management subsystem 54, segment builder 55A, measure builder 55B and measure relationship builder 55C, analyst definition subsystem 56, InfoFrame viewing subsystem 53 and MDT Administrator interface 57.

Log-in module 50 verifies that only one copy of the client subsystem 12 is running on computer 30, checks the localization of computer 30, connects to computer 32, and interacts with the user to log him onto client subsystem 12. During logon, log-in module 50 verifies a user's name and password and then retrieves any user preferences that may have been earlier defined. The only request from a user that is handled by log-in module 50 is a request to log onto client subsystem 12.

Log-in module 50 issues the following requests:

| | |
|---|---|
| • single program running | to Operating System (DOS, NT, Windows 95, etc) |
| • retrieve localization | to Operating System (DOS, NT, Windows 95, etc.) |
| • connect to server | to Client/Server module |
| • disconnect from server | to Client/Server module |
| • authenticate user | to Metadata API 60 |
| • run main menu | to Main Menu 51 |
| • run admin menu | to MDT Administrator Interface 57 |

If the user is the System Administrator, log-in module 50 displays MDT Administrator interface 57 "Setup" menu item. If the user is an end user or knowledge worker, a Main menu and toolbar interface 51 are displayed, as are the interfaces associated with subsystems 53–55.

MDT Administrator interface 57 is used by a System Administrator to perform system administration tasks, such as making user-defined segments available globally and creating and editing Business Concepts. Interface 62 is preferably only available to System Administrators during system installation.

Folder management subsystem 54 handles all functions related to manipulating, storing, and retrieving Folder hierarchies, and the InfoFrames and Agents that are stored in those Folders. It also handles querying from DAI subsystem 14 for newly-completed InfoFrames, both when client subsystem 12 starts up, and then periodically thereafter.

Folder management subsystem 54 also handles User requests for operations on:

Folders (new, delete, rename)

Agents (edit, delete, run now, print)

InfoFrames (view, delete, annotate, print [in cooperation with the InfoFrame View Window])

Each folder is represented by one folder object. A folder stores a list of child folders, a list of InfoFrames, and a list of Agents. Folder objects are created and deleted by folder management subsystem 54 in response to user requests.

Subsystems 55B provides a user with the ability to create new measures, update measures, or delete existing measures. This information is sent to a Metadata API 60 and thereafter to DAI subsystem 14 for updating the user's Metadata 25.

Subsystem 55A provides a user with the ability to create new Segments, update segments, or delete existing Segments. This information is sent to a Metadata API 60 and thereafter to DAI subsystem 14 for updating the user's Metadata 25.

Finally, Subsystem 55C provides a user with an interface to modify measure relations and to constrain measure relations. The user selects the current measure and whether to evaluate that measure's relationships when it increases or decrease. Then the user can then select from a list of other measures and define their relationship to the current measure. These relationships are in the form of "decreases", "increases", or "is unrelated to the current measure". Also, every relationship between two measures can be constrained. The relationship between measures and the constraints placed upon them are saved on computer 32 for use in generating InfoFrames.

Analyst definition subsystem 56 handles all functions related to user selection of parameters needed to generate specific reports. It also allows the user to define and schedule Alerts for scheduled reports.

The user may invoke an existing Analyst, delete one from within the folder management subsystem 54, or create a new Analyst. The five types of Analysts are:

Summarization

Segment Comparison

Measure Comparison

Change Analysis

Trend Analysis

The Summarization Analyst requires the following user selection requirements:

Analyst name

Primary measure, other optional measures

Primary segment, other segments

Time period

Optional schedule

Optional trigger type of year used optional trigger event (Alert Message, InfoFrame, Run another nalyst)

The Segment Comparison Analyst requires the following user selection requirements:

Analyst name

Primary measure

Primary segment, a comparison segment

Time period

Optional schedule

Optional trigger type of year used optional trigger event (Alert Message, InfoFrame, Run another nalyst)

The Measure Comparison Analyst requires the following user selection requirements:

Analyst name

Primary measure, Comparison measure

Primary segment, other optional segments base time period, comparison time period Optional schedule Optional trigger type of year used optional trigger event (Alert Message, InfoFrame, Run another nalyst)

The Change Analysis Analyst requires the following user selection requirements:

Analyst name

Primary measure

Primary segment, Other optional segments base time period, comparison time period Optional schedule Optional trigger type of year used optional trigger event (Alert Message, InfoFrame, Run another nalyst)

The Trend Analysis Analyst requires the following user selection requirements:

Analyst name

Primary measure

Primary segment, other optional segments.

Time period, Time interval.

Optional schedule

Optional trigger type of year used optional trigger event (Alert Message, InfoFrame, Run another nalyst)

The user can save or run the analyst definition. The user is restricted to choosing one Segment from within each Business Concept with the exception of Target Segment, in which case he may select only one segment and more than one child partition of the selected segment. The user may choose to schedule an Analyst or to modify or delete an existing schedule. Unscheduled Analysts will be run when the user commands. Scheduled Analysts will be submitted to the server for execution at a later date or periodic execution.

The user may specify a trigger condition for the Analyst to specify an Exception Analyst. When submitted to the server it will be run regularly to test for its trigger condition, and will return an Alert or an InfoFrame whenever the trigger condition occurs.

The Analyst definition subsystem 56 makes the following requests to the folder management subsystem 54:

| | |
|---|---|
| Save | Check if the user has selected the appropriate parameters for the selected analyst. Send a request to the folder management subsystem 54 to save an existing Analyst Definition |
| Save As | Check if the user has selected the appropriate parameters for the selected analyst. Send a request to the folder management |
| Submit | subsystem 54 to save an existing Analyst Definition Check if the user has selected the appropriate parameters for the selected analyst. Send a request to the folder management subsystem 54 to submit a report generation |

The Analyst definition subsystem also makes the following requests to Metadata API 60:

| | |
|---|---|
| Get all Measures | The request will be made to Metadata API 60 each time there is a need for it at the initialization point of a dialog |
| Get all Business Concepts | The request will be made to Metadata API 60 subsystem each time there is a need for it at the initialization point of a dialog |
| Get a Business Concept's Partitions | The request will be made depending on a user's selection of a business concept |
| Get Partitions | The request will be made depending on a user selection of a defined Segment. |
| Get Segments | The request will be made depending on a user selection of a partition. |

InfoFrame viewing subsystem 53 includes a WYSIWYG browser which displays a selected InfoFrame on screen, when InfoFrame viewing subsystem 53 gets a notification from folder management subsystem 54 to view a InfoFrame. If the user decides to drill down from the current InfoFrame, InfoFrame viewing subsystem 53 notifies the folder management subsystem 54 to send a new report request.

When the user double-clicks on an InfoFrame or chooses "menu item -View" from the File menu Folders, the folder management subsystem 54 notifies the InfoFrame viewing subsystem to view the InfoFrame. When the user clicks on a hypertext to drill down from the current InfoFrame, the InfoFrame viewing subsystem 53 passes the drill down information to the folder management subsystem 54 to send a new report request to DAI subsystem 14.

InfoFrame viewing subsystem 53 includes a parser which parses the InfoFrame, and extracts the completed report, which is written in HTML. In an HTML file, HTML tags indicate document elements, structure, formatting, and hypertext linking to other documents or resources. The parser then outputs all the information for display. In the current invention, the hyperlink may instance a new Analyst and a new InfoFrame The InfoFrame viewing subsystem 53 allows a user to display and format text, tables, and graphs displayed by display 22 based on the information gathered by the parser. A header, a footer, and annotations can be added to a InfoFrame. The user can save the viewed InfoFrame. The user can also save an InfoFrame as a HTML file in either UNICODE or ASCII code format. A saved HTML InfoFrame can be attached to an e-mail to mail out. Any HTML version 3.0 browser, or equivalent, can read the HTML InfoFrame.

Metadata API 60 handles most of the communications between client subsystem 12 and DAI subsystem 14. These communications involve four basic types of data: metadata 25, InfoFrames, user profiles, and data warehouse schema. For metadata communication, Metadata API 60 provides the ability to add, delete and update metadata 25. For InfoFrames, Metadata API 60 provides the ability to request a report, get the status of a report, retrieve a report and cancel a report request. For user profiles, Metadata API 60 provides the ability to add a user, authenticate a user and delete a user. The communication for data warehouse schema is to retrieve it.

Metadata API 60 allows a user to define new ways of looking at a business. A user cannot modify the public segments, the basic measures or the public measures. However, the user can create new Business Indicators and new Segments. In a typical organization of users and system administrators, only system administrators can create or change basic business measures. Administrators and knowledge workers can create, edit or delete public composite measures, public segments and public measure relationships.

The MetaData API 60 will handle the following requests from other client subsystems:

| | |
|---|---|
| update metadata | from subsystems 55A/55B/55C |
| get report status | from Folder management subsystem 54 |
| generate report | from Folder management subsystem 54 |
| retrieve report | from Folder management subsystem 54 |
| retrieve schema | from MDT Administrator Interface 57 |
| update schedule | from Analyst Definition subsystem 56 |
| cancel a report | from Analyst Definition subsystem 56 |
| authenticate user | from Log-in module 50 |
| add a user | from MDT Administrator Interface 57 |
| delete a user | from MDT Administrator Interface 57 |
| update user password | from MDT Administrator Interface 57 |

Metadata API 60 sends the following requests directly to DAI subsystem 14:
 disconnect from computer 32
 send data to DAI subsystem 14
 receive data from DAI subsystem 14

Figure 3:
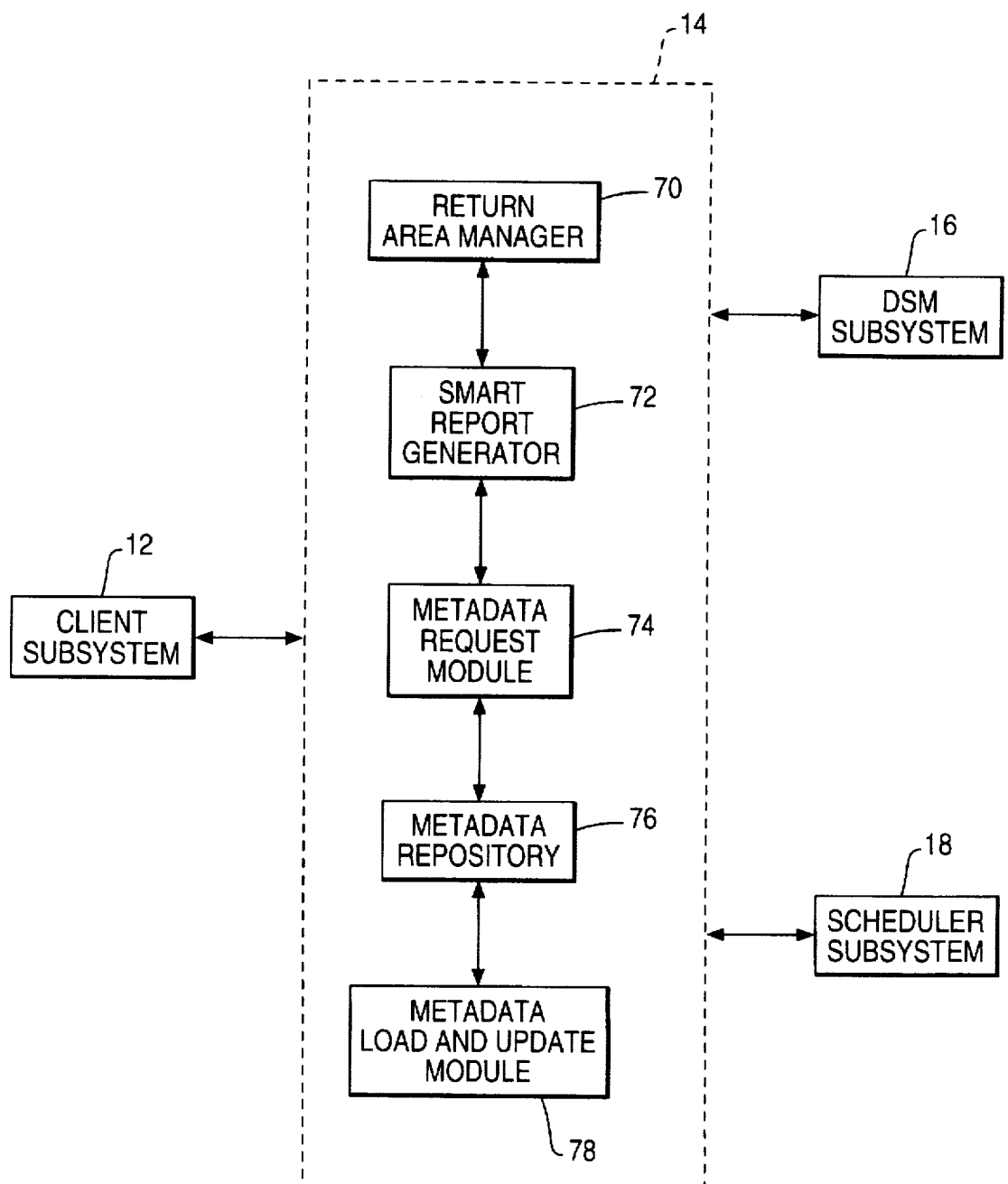
FIG. 3 is a block diagram of a data abstraction intelligence subsystem within the system of FIG. 1.

Turning now to FIG. 3, DAI subsystem 14 includes return area manager 70, InfoFrame generator 72, metadata request module 74, metadata repository 76, and metadata load and update module 78.

Metadata repository 76 contains a representation of metadata 25 within data warehouse 24. This metadata 25 is the core of system 10; it provides a customizable business view over the relational data in warehouse 24 and is the primary vocabulary for the specification of InfoFrames. Metadata repository 76 gets populated at startup time by DSM subsystem 16 from the persistent metadata representation in data warehouse 24.

There are four fundamental kinds of metadata 25 in metadata repository 76, listed and described below:

Business Concepts: business concepts represent the business dimensions along which the data can be viewed. Each dimension imposes a hierarchy over the underlying data, and dimensions can be combined to drive "drill-down" or "drill-up" operations. For example, a simple retail application might have two Business Concepts: Market and Product. The Market hierarchy is composed of Sales Regions, each of which consists of several States, each of which consists of a set of Stores. The Product Hierarchy is composed of a set of Departments (Home Electronics, Men's Clothing, Hardware), each Department is composed of product Categories (Shirts, Shoes, Slacks), and each Category is composed of individual manufacturer's product lines. Time is a dimension that is important in all applications, and will be represented in system 10. Users can add new Business Concepts (see below). These, as all of the metadata 25 in metadata repository 76, must be mapped into relational form (that is, into SQL) in order to actually query data warehouse 24. Mapping is done by DSM subsystem 16 during the process of processing Dimensional Queries (see below).

Business Indicators: Business Indicators are the important measures of data of interest. For example, product Volume, Price, or Current Stock are all Business Indicators. The use of time in a query further refines the idea of a Business Indicator; for example, "Change in Volume" applies between two time periods.

Alerts: Alerts are essentially tests over the data, but they are not part of the metadata. They are specified in the Analyst in terms of the metadata. For example, a user might specify that if the available stock of a product falls by some percentage, to generate the appropriate InfoFrame. The user also specifies how often to check the Trigger condition. A list of Alerts is maintained by DAI subsystem 14 and executed by scheduler subsystem 18. This metadata 25 is also available to DAI subsystem 14 and is used to generate InfoFrame information.

Measure Relationshops: Measure Relationshops are simple expressions of business causality; for example, "Increased Sales mean Increased Profit". This kind of metadata 25 is used to generate supporting information for a InfoFrame or, alternatively, alert the user to trends that run counter to the set of Measure Relationships.

Metadata 25 is initially created during installation of the present invention at the customer's site. The process of creating the metadata 25 is illustrated in more detail in FIGS. 7A–7E. What is included within metadata 25 depends on the industry (some metadata 25 will be industry-specific and usable by all companies in that industry), the specific customer of the present invention, and the structure of the customer's data warehouse 24. During installation, some industry-specific metadata 25 is used, some company specific metadata 25 may be created, and the mapping information needed to map metadata 25 to data warehouse 24 is created. All metadata 25, including the mapping information, is stored in a set of relational tables. These relational tables are kept in data warehouse 24 and used by the present invention to create reports for the user.

Metadata request module 74 handles all requests for metadata 25, either from client subsystem 12 or DAI subsystem 14. Client subsystem 12 requests metadata 25 from DAI subsystem 14 to be presented to the end users. InfoFrame generator 72 requests metadata 25 in order to create Dimensional Queries as part of instantiating a InfoFrame for a user. A request for metadata 25 might be, for example, a request for all sub-concepts of a particular Business Concept.

Metadata request module 74 also handles metadata updates from client subsystem 12. A user adds new Segments by specifying a new dimension from which to group the data. This dimension must be supported by an existing data attribute in the warehouse data. For example, a Product may include a List-Price and a Discount-Price. The user can specify a new dimension called "Discount-Factor", specified using the percent difference between the Discount-Price and the List-Price, and use that to create three new Segments: Heavily-Discounted Products, Slightly-Discounted Products, and Non-Discounted Products. These new Segments can now be used in subsequent InfoFrame requests, and, if indicated by the user, made persistent by writing them back into data warehouse 24 by metadata load and update module 78.

Request Structures are passed from one subsystem to another when one subsystem requires processing and results from another. Request Structures vary according to the type of request being sent. Most requests, however, have some common attributes, such as an identification field, an owner, a name and a description of the request.

Business Concept Update Requests are sent from client subsystem 12 to DAI subsystem 14 and are preferably issued only by the System Administrator. Business Concept Update Requests are requests for adding a new Business Concept to the metadata 25. The requests have the following format:

| BC_ID: | ID which uniquely identifies this Business Concept |
| --- | --- |
| BC_NAME: | The name of this Business Concept |
| BC_DESC: | The description of this Business Concept |
| MAPPING: | Mapping of this Business Concept to data warehouse tables |

Business Indicator Update Requests are sent from client subsystem 12 to DAI subsystem 14. Business Indicator Update Requests are requests for adding a new Business Indicator to the metadata 25.

Business Indicator Update Requests primarily include primitive and compound requests. Primitive requests have the following format:

| BI_ID: | ID which uniquely identifies this Business Indicator |
| --- | --- |
| OWNER: | The user who created this Business Indicator |
| BI_NAME: | The name of this Business Indicator |
| BI_DESC: | The description of this Business Indicator |
| MAPPING: | Mapping of this Business Indicator to data warehouse tables |
| ROLLUP_OP: | Operator for performing the roll-up operation |

Compound requests have the following format:

| BI_ID: | ID which uniqely identifies this Business Indicator |
| --- | --- |
| BI_NAME: | The name of this Business Indicator |
| BI_DESC: | The description of this Business Indicator |
| EXP: | The expression which describes this Business Indicator function |

Causal Indicator Update Requests are sent from client subsystem 12 to DAI subsystem 14. Causal Indicator Update Requests add a new Causal Indicator to the metadata 25. The request has the following format:

| CI_ID: | ID which uniquely identifies this Casual Indicator |
| --- | --- |
| OWNER: | The user who created this Causal Indicator |
| CI_NAME: | The name of this Causal Indicator |
| CI_DESC: | The description of this Causal Indicator |
| BI_ID1: | Business Indicator which is the independent variable of this causal relationship |
| OP: | The operator for this causal relationship |
| BI_ID2: | Business Indicator which is the dependent variable of this causal relationship |
| RANGE: | When OP is +/−, the range where it is + and the range where it is − |

Schema Requests are sent from client subsystem 12 to DAI subsystem 14 and may only be issued by the System Administrator. Schema Requests are requests to retrieve the data base schema from data warehouse 24. This type of request is just a simple unformatted message to DAI subsystem 14.

Segment Update Requests are sent from client subsystem 12 to DAI subsystem 14. Segment Update Requests are requests for adding a new Segment to the metadata 25. Segment Update Requests have the following format:

| SEG_ID: | ID which uniquely identifies this Segment |
| --- | --- |
| OWNER: | The user who created this Segment |
| SEG_NAME: | The name of this Segment |
| SEG_DESC: | The description of this Segment |
| SEG_LEVEL: | Level in the Segment Hierarchy of this Segment |
| BC_ID: | The Business Concept for this Segment |
| ATTR_ID: | The Attribute(s) for this Segment |
| OP: | The operator(s) for this Segment |
| VALUE: | The value(s) for this Segment |

InfoFrame Requests are sent from the Client subsystem to the DAI subsystem. This type of request is to create a new InfoFrame based on user specified selections. The request has the following format:

| SR_ID: | ID which uniquely identifies this InfoFrame |
| --- | --- |
| OWNER: | The user who created this InfoFrame |
| SR_NAME: | The name of this InfoFrame |
| SR_DESC: | The description of this InfoFrame |
| SR_TYPE: | One of the four types of InfoFrames |
| BC_ID: | The Business Concept for this InfoFrame |
| SEG_ID: | The Segment(s) for this InfoFrame |
| TIME: | The time interval(s) for this InfoFrame |

Dimensional Queries are sent from DAI subsystem 14 to DSM subsystem 16. Dimensional Queries formulate requests for data from data warehouse 24. DSM subsystem 16 converts Dimensional Queries into SQL statements.

The DAI subsystem 14 communicates a dimensional query to the DSM subsystem 16 as a list of metadata segment definitions or partition definitions, a list of metadata measure definitions and a Measure Value Table. The DSM subsystem 16 converts these to SQL Queries and submits them to the Data Warehouse 24. The results returned by the Data Warehouse to the DSM are returned to the DAI in the Measure Value Table.

Client subsystem 12 produces the following outputs to DAI subsystem 14:

Business Concept Update Requests
Business Indicator Update Requests
Causal Indicator Update Requests
Schema Requests
Segment Update Requests
InfoFrame Requests
Cancel Requests DAI subsystem 14 provides the following outputs to client subsystem 12:

Business Concept Structures
Business Indicator Structures
Causal Indicator Structures Schema Structures
Segment Structures
InfoFrames
Error/Status Codes
DAI subsystem 14 provides the following outputs to scheduler subsystem 18:
Schedule Analyst Request
Delete Analyst Request
DAI subsystem 14 provides the following outputs to DSM subsystem 16:
Dimensional Queries
Metadata Retrieval Requests
Schema Requests
DSM subsystem 16 provides the following outputs to DAI subsystem 14:
Updated Metadata
Data from the Data Warehouse
Database Schema
DSM subsystem 16 provides the following outputs to data warehouse 24:
SQL Statements
DSM subsystem 16 receives the following inputs from data warehouse 24:
Metadata
Database Schema
Warehouse Data
Scheduler 18 provides the following output to DAI subsystem 14:
Analyst Definitions Metadata load and update module 78 populates metadata repository 76 from the persistent metadata stored in data warehouse 24 upon system startup. In addition, when a user specifies new Business Concepts and indicates that he wants them saved, metadata load and update module 78 writes them back into data warehouse 24 for future use.

InfoFrame generator 72 fulfills the primary purpose of DAI subsystem 14. Report generation begins when a user's Analyst containing an InfoFrame definition is received by the DAI. The type of Analyst is used to select appropriate Drill Down Heuristics and Text Generation Rules from the set implemented in the DAI. Drill Down Heuristics are used to determine if there any data relationships between the segments of the free attributes of the target segment which must be reported. Text Generation Rules are used to determine what features of the target segment ought to be reported and what relationships to sibling segments, other segments in the restricted attributes of the target segment, ought to be reported. Text Generation rules may specify localizable text, graphs or tables as appropriate output. The output of the Report Generation process is a fully instantiated InfoFrame returned to client subsystem 12 in the form of HyperText Markup Language (HTML), a widely-used standard for building portable compound documents.

InfoFrame generator 72 has several kinds of knowledge:
Knowledge of how to map Abstract Queries into Dimensional Queries
Knowledge of how to use metadata 25 to generate default choices (choices not made by the user in the InfoFrame Request)
Knowledge of how to use both metadata 25 and data returned from the warehouse to guide the selection of both text components
Knowledge of how to use both metadata 25 and data returned from the warehouse to guide the selection of different types of graphical presentations.

For example, the Summary InfoFrame may take as arguments a Business Concept, a Business Indicator, and a time period. The Report Generation Module uses the user selected parameters, for example, the Business Concept "Product", the Business Concept Segment "Men's Shirts", the Business Indicator "Volume", and the time period "December 1994" to create a Dimensional Query. This Dimensional Query is sent to the Data and Schema Manipulation subsystem, which translates this query into SQL and actually executes it. It returns the computed data to DAI subsystem 14, where other Abstract Queries might embed the actual number in a bullet.

Other Abstract Queries have conditionals associated with them. To build off the previous example, another part of the summary System Template might specify the creation of a graph, showing how the target-business-indicator (volume) is apportioned among the segments of the target-business-concept (shirts). In this case, report generator 72 makes a metadata request to return the set of segments, in this example, the dimension that specifies the shirt manufacturer. All volume information is requested for each manufacturer of shirts. Now, additional information guides report generator 72 in the selection of a choice of graph. For example, if the number of segments (manufacturers in this case) is small, like 7 or less, then a pie graph is appropriate, otherwise, a bar graph is preferred. If the number of segments is very large, then aggregate the bottom 20 percent (in terms of the Business Indicator, in this case, Volume) and use that aggregate with the label "Other" in the graph.

Return area manager 70 keeps track of InfoFrames and Alert Evaluations with positive results by user that are waiting for delivery to client subsystem 12. When a user logs into system 10, client subsystem 12 issues a request to DAI subsystem 14 to return all data for that user in the return area. Return area manager 70 retrieves the information from the return area on server computer 32 and sends it back to client computer 30 through DAI subsystem 14.

Figure 4:
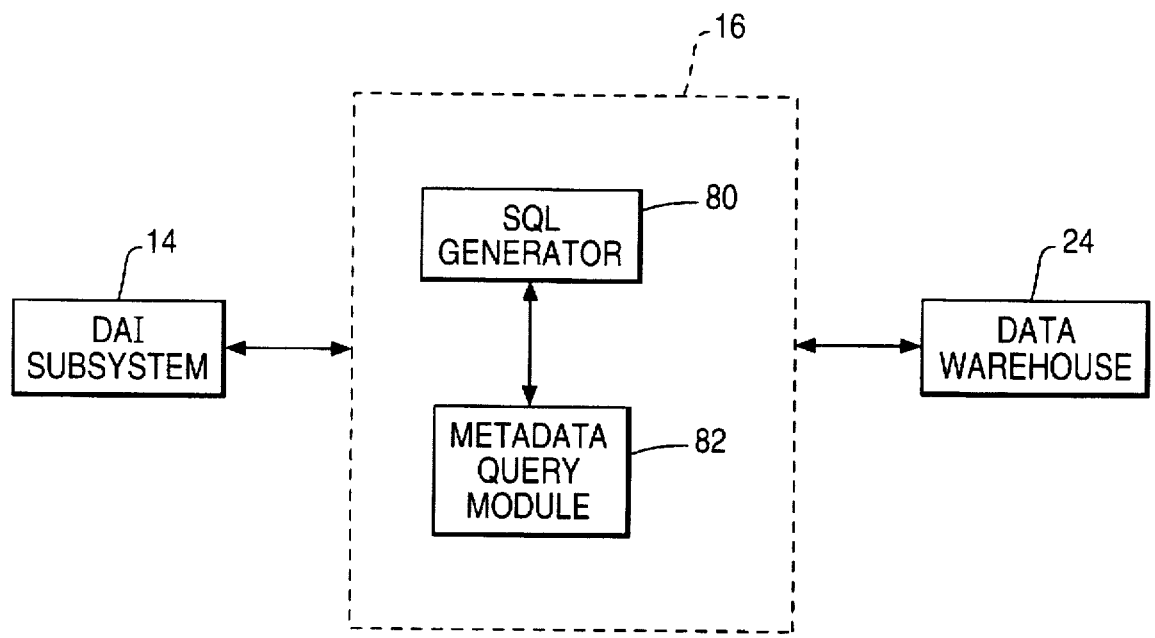
FIG. 4 is a block diagram of a data and schema manipulation subsystem within the system of FIG. 1.

Turning now to FIG. 4, DSM subsystem 16 includes SQL generator 80 and metadata query module 82.

SQL generator 80 translates dimensional queries received from DAI subsystem 14 into SQL statements used to retrieve data from data warehouse 24. A mapping from business concepts to database entities is stored in the metadata 25 and is used in the formatting of the SQL statements. SQL generator 80 provides to DAI subsystem 14 for use in creating InfoFrames.

Metadata query generator 82 processes requests for metadata 25 submitted by DAI subsystem 14. At system startup, DAI subsystem 14 requests all metadata 25 in order to initialize the knowledge base. Metadata query generator 82 is also invoked whenever the user modifies his Segments, causing DAI subsystem 14 to issue an update metadata request.

Figure 5:
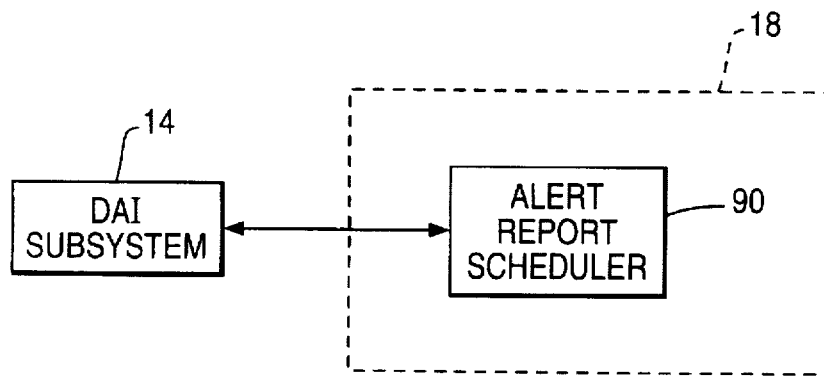
FIG. 5 is a block diagram of a scheduler subsystem within the system of FIG. 1.
Figure 7B:
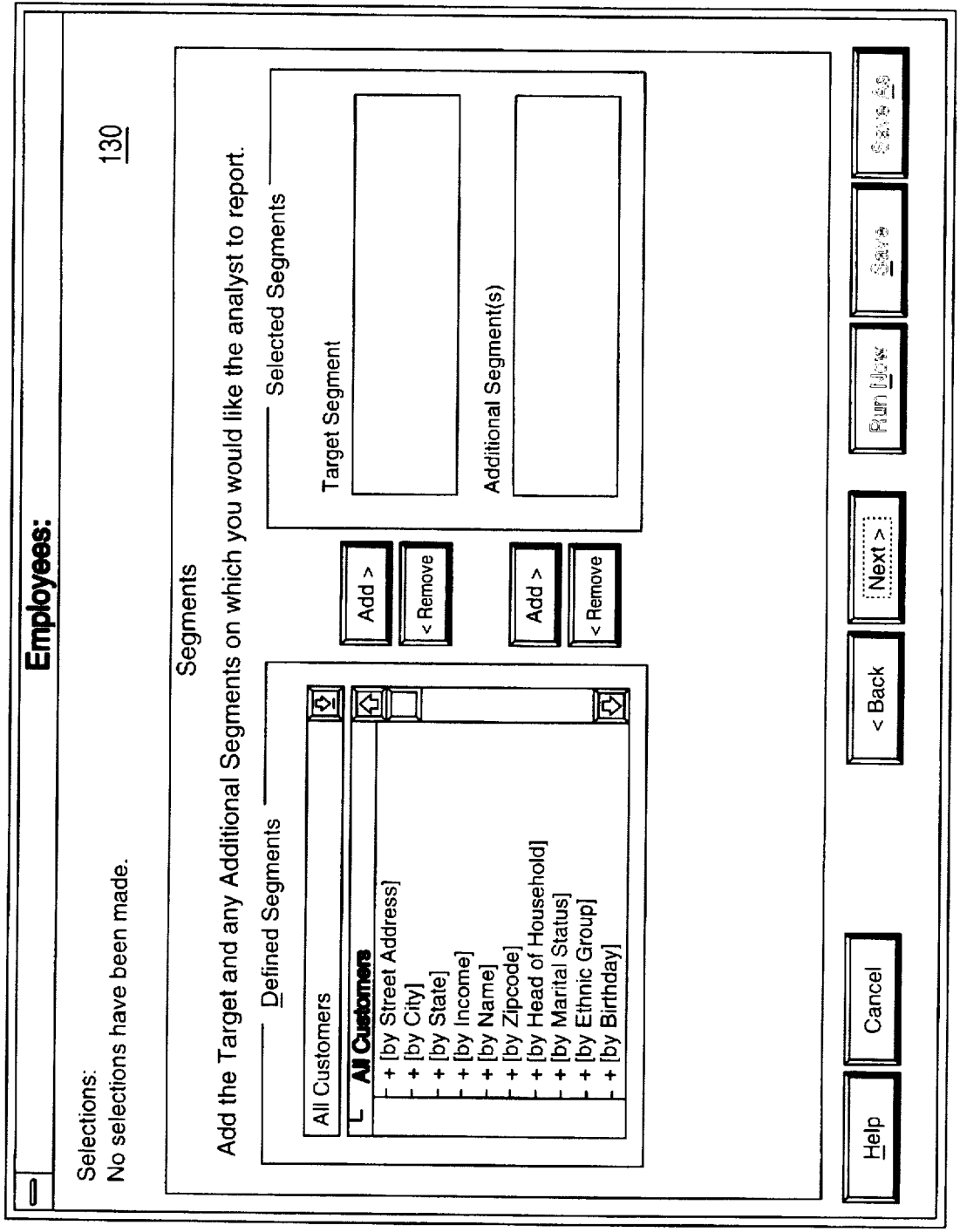
Figure 7E:
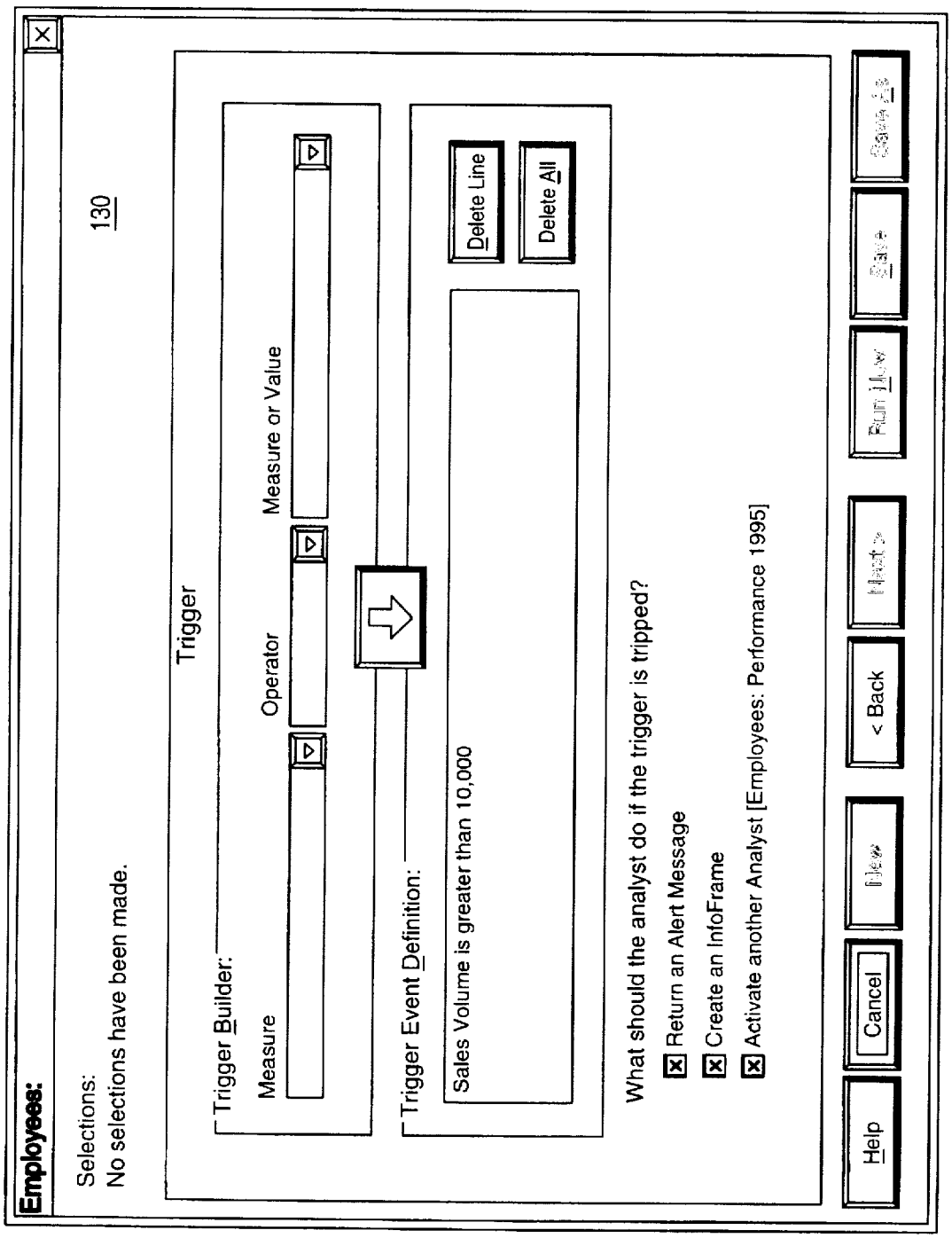

Turning now to FIG. 5, scheduler subsystem 18 includes alert and report scheduler 90. The scheduler periodically tests queued Scheduled Analysts and will dispatch those to the have come due to the DAI subsystem 14. It will periodically dispatch all submitted Exception Analysts to the DAI subsystem 14 so that they can test for trigger conditions. The schedule and trigger periods are independently configurable by the MDT Administrator. The scheduler passes analysts to the CDAI 14B, by way of the Dispatcher 2513 (FIG. 27).

Turning now to FIGS. 6–12, client subsystem 12 and its operation are illustrated in more detail.

Client subsystem 12 includes a primary overlay 98 which appears when client subsystem 12 is executed. Overlay 98 includes three display areas 100–104 within a common Folders window, pull-down menus 106, and buttons 110–120. The Folders window may be maximized (as it is shown in FIG. 6) to eliminate its borders, resized, or minimized as an icon within client subsystem 12. The Folders window cannot be closed.

Display area 100 contains a list of folders, which represent the metaphor used by client subsystem 12 in organizing InfoFrames and the analysis that creates them. A folder is opened by highlighting it and selecting it with input device 21. The first folder in the list is opened by default when client subsystem 12 is executed.

Figure 12:
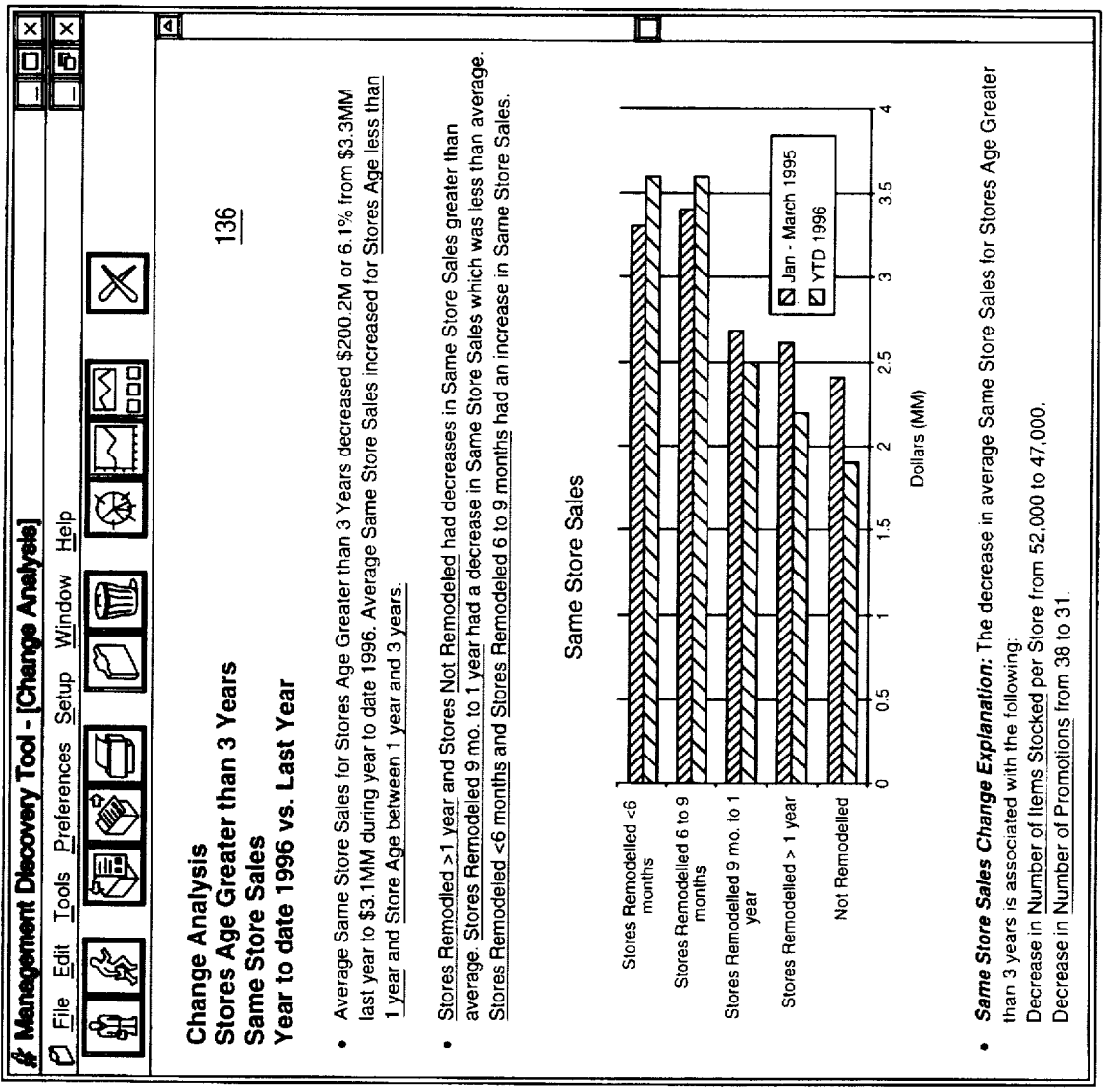

Display area 102 contains a list of InfoFrames within a selected folder. A InfoFrame may be viewed by highlighting it and selecting it with input device 21. An Analysis window 136 appears containing the InfoFrame. The title bar of the window indicates the type of preselected analysis that has been performed. For example, in FIG. 12, "change" analysis was preselected by a user to be the type of analysis to run. The Analysis window 136 may be maximized (as it is shown in FIG. 12) to eliminate its borders, resized, or minimized as an icon within client subsystem 12. The Analysis window 136 may be closed by selecting button 122 (FIG. 12) or by a manner well known to users of Windows 3.1 and other windows operating environments.

Display area 104 contains a list of Analysts within a selected folder. An Analyst is a personification of preselected operations performed on preselected data for the purpose of generating a InfoFrame. An Analyst may be viewed by highlighting it and selecting it with input device 21. Analyst Builder windows 130 (FIGS. 7A–7E) appears containing the preselected settings saved within the Analyst and used to generate the corresponding InfoFrame listed in display area 102. (The InfoFrames listed in display area 102 are arranged in the same order as the Analysts listed in display area 104, and have the same titles as the corresponding Analysts). The Analyst Builder window 130 may be not be maximized, resized, or minimized as an icon; it may only be closed in a manner well known to users of Windows 3.1 and other windows operating environments.

Buttons 110–122 (FIG. 6) implement the primary operational commands within pull-down menus 106 and are activated using a pointing device. Button 110 calls the Analyst Builder windows 130 (FIGS. 7A–7E).

Figure 8A:
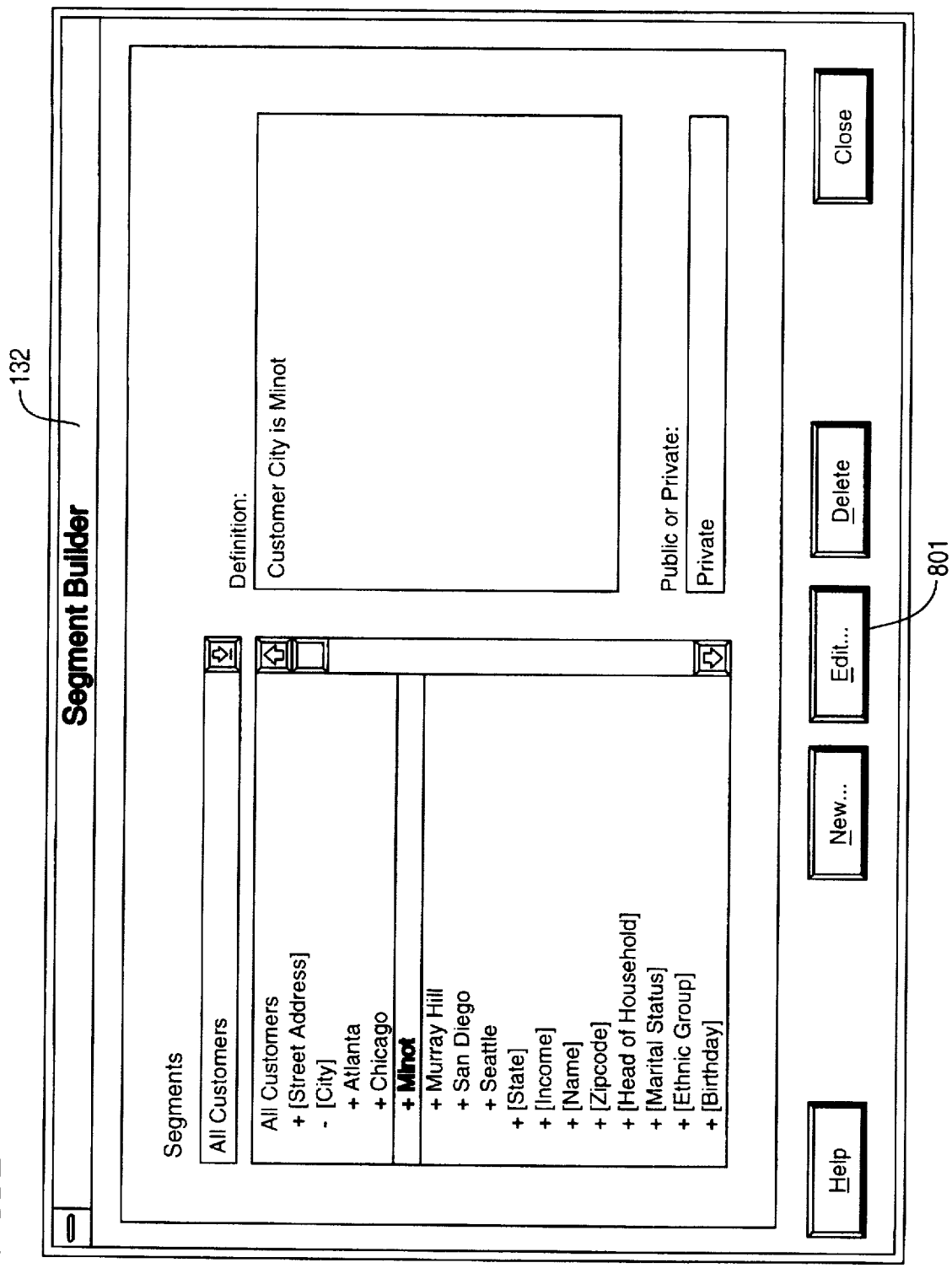

Button 112 calls a Segments divider within a Business Information Setup window 132 (FIG. 8A). Button 116 deletes a selected file or folder within display areas 100–104. Button 118 creates a new folder. Button 120 calls the Analysis window 136 with a selected InfoFrame from display area 102. Button 122 closes client subsystem 12. Button 150 is a print button, button 151 allows the user to create measures, and button 152 allows the user to create or edit measure relationships.

With reference to FIGS. 7A–7E, Analyst Builder window 130 allows a user to define how selected data is analyzed. An Analyst is named under the Analyst Name field. A type of analysis is chosen under the Type of Analysis field. A primary measure to be used in implementing the analysis is chosen under the Primary Measure field. Segments to be reported on are chosen from the list of Defined Segments. Finally, a period for the InfoFrame is defined under the Time Slice Considered fields. A InfoFrame can be created immediately by selecting the Report Now button, or can be scheduled as part of a batch of InfoFrames by selecting the Schedule Analyst button.

With reference to FIG. 8A, the Segments divider within the Business Information Setup window 132 allows Segments to be created, modified, or deleted. A description of the segment appears in the Description field. Upon activation of button 801 by the user, the window 132 of FIG. 8B is launched, allowing the user to edit segment definitons.

Figure 9A:
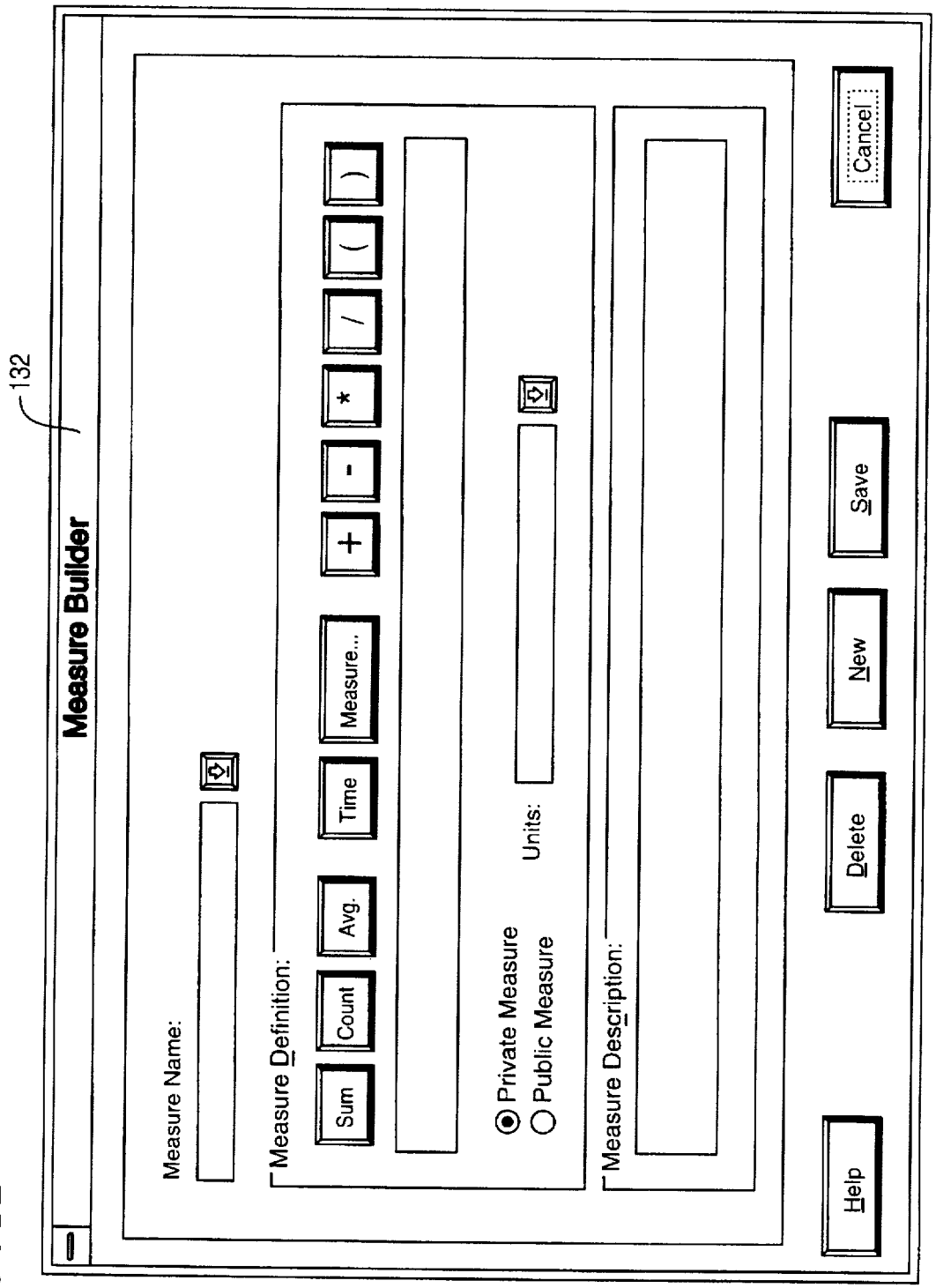
Figure 9B:
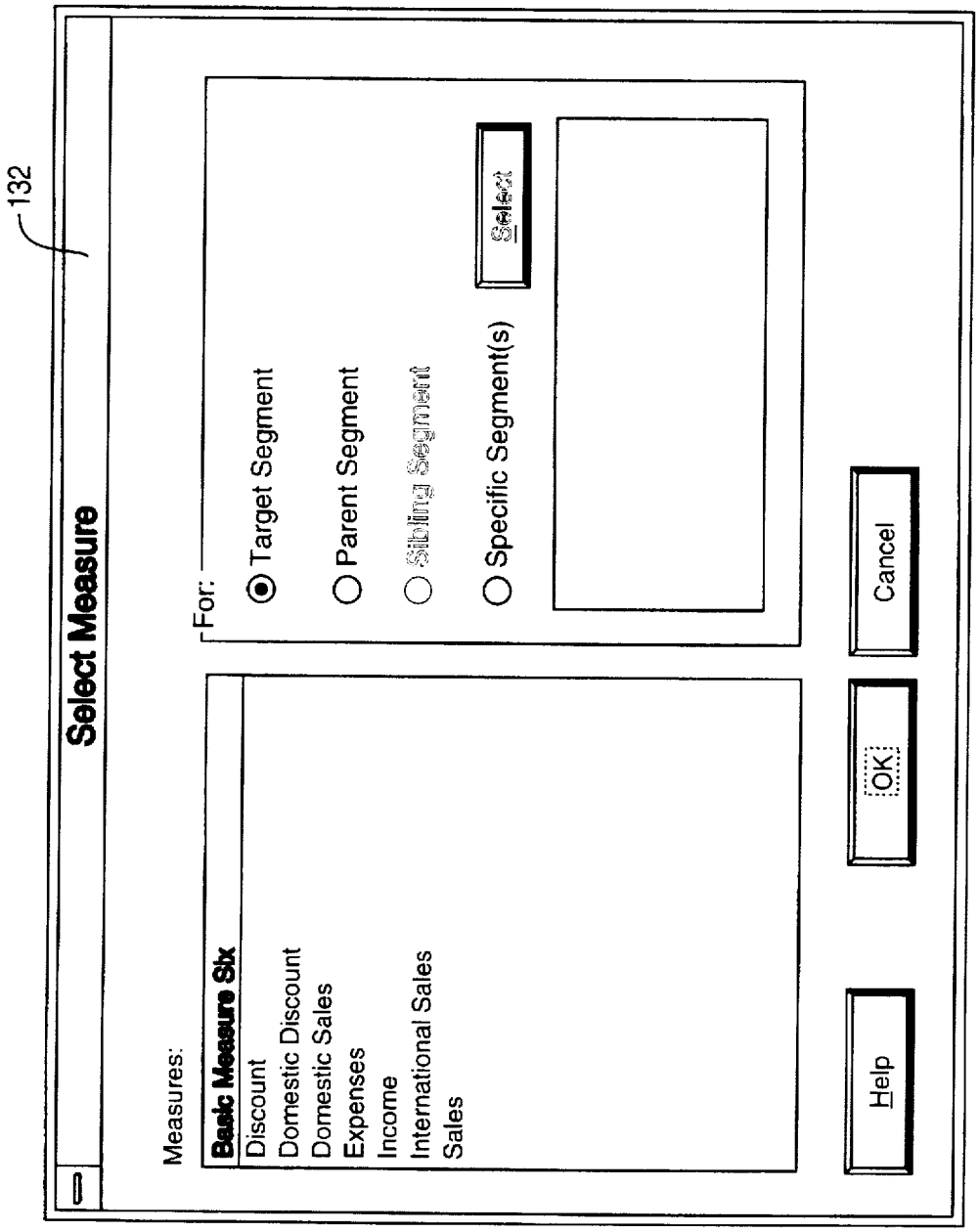
Figure 9C:
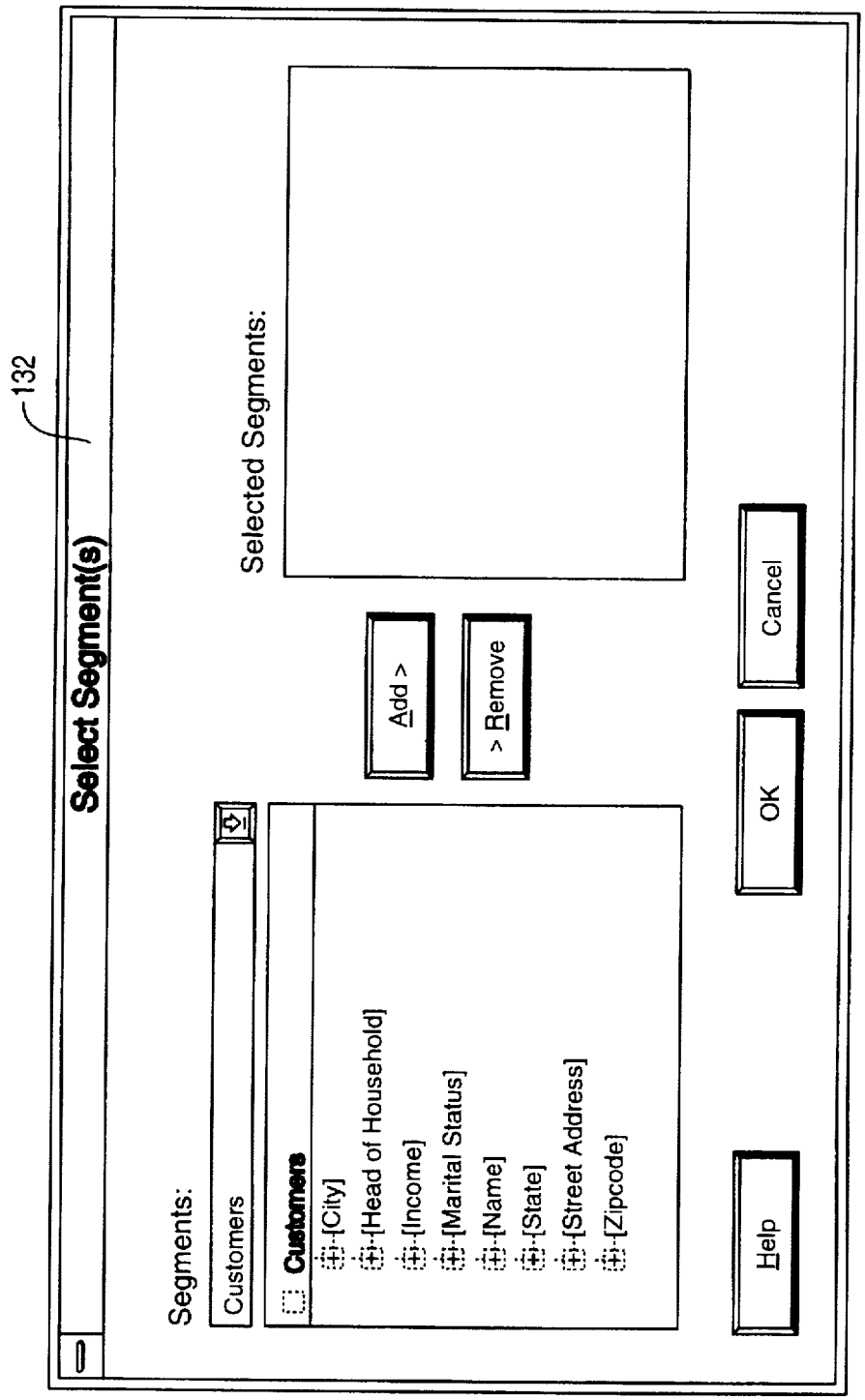

With reference to FIG. 9A, Measures of information may be created and modified within the Measures divider of the Business Information Setup window 132. A name for each Measure appears in the Measure Name field. A definition of a Measure appears in the Definition field. Mathematical operators, Time Slice constraints, Segment constraints, and constraints from other Measures may be inserted into the Definition using the corresponding buttons below the Definition field. With respect to FIGS. 9B and 9C, windows 132 may be displayed to select measures and select segments, respectively.

Figure 10:
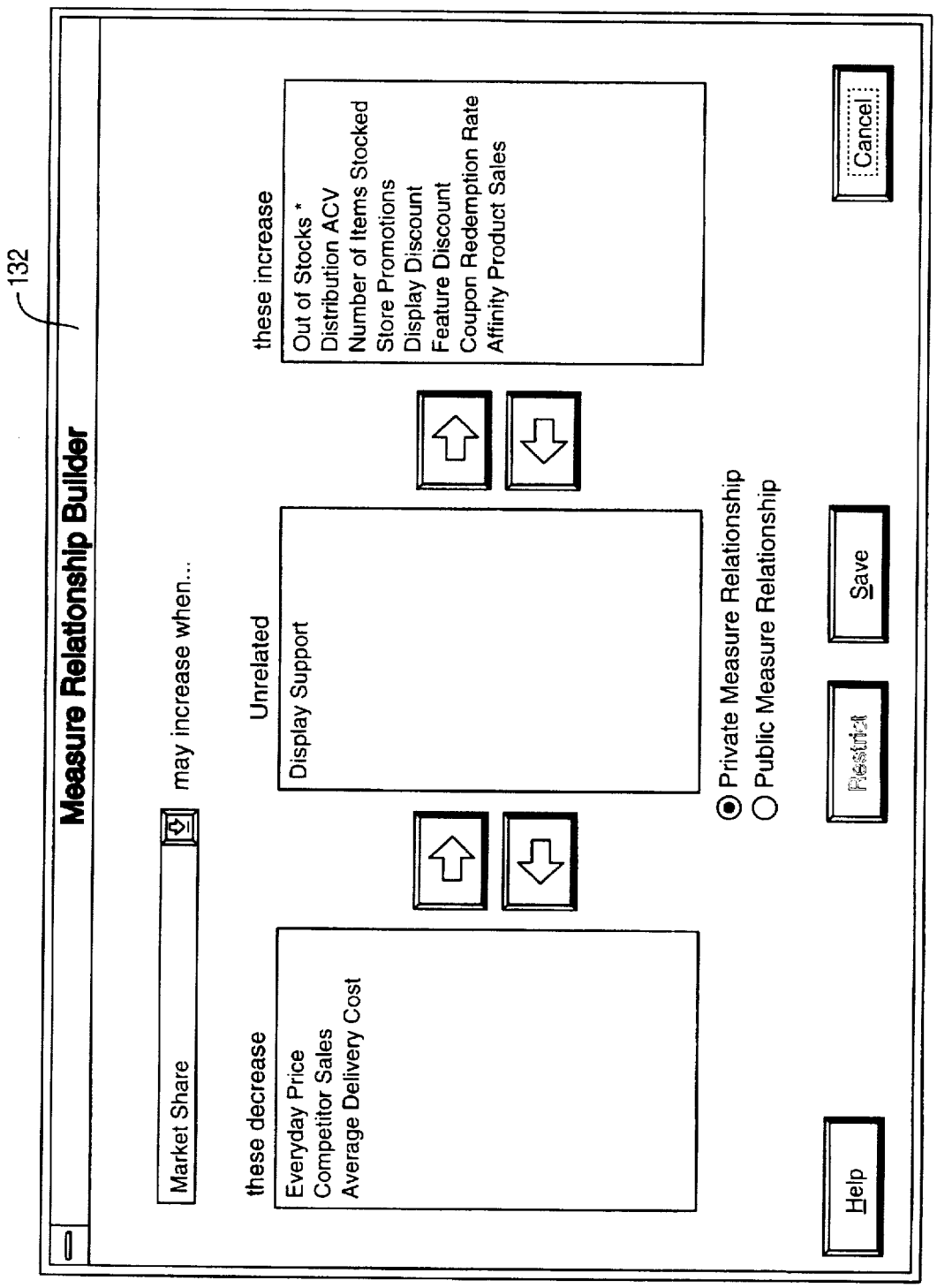
Figure 11:
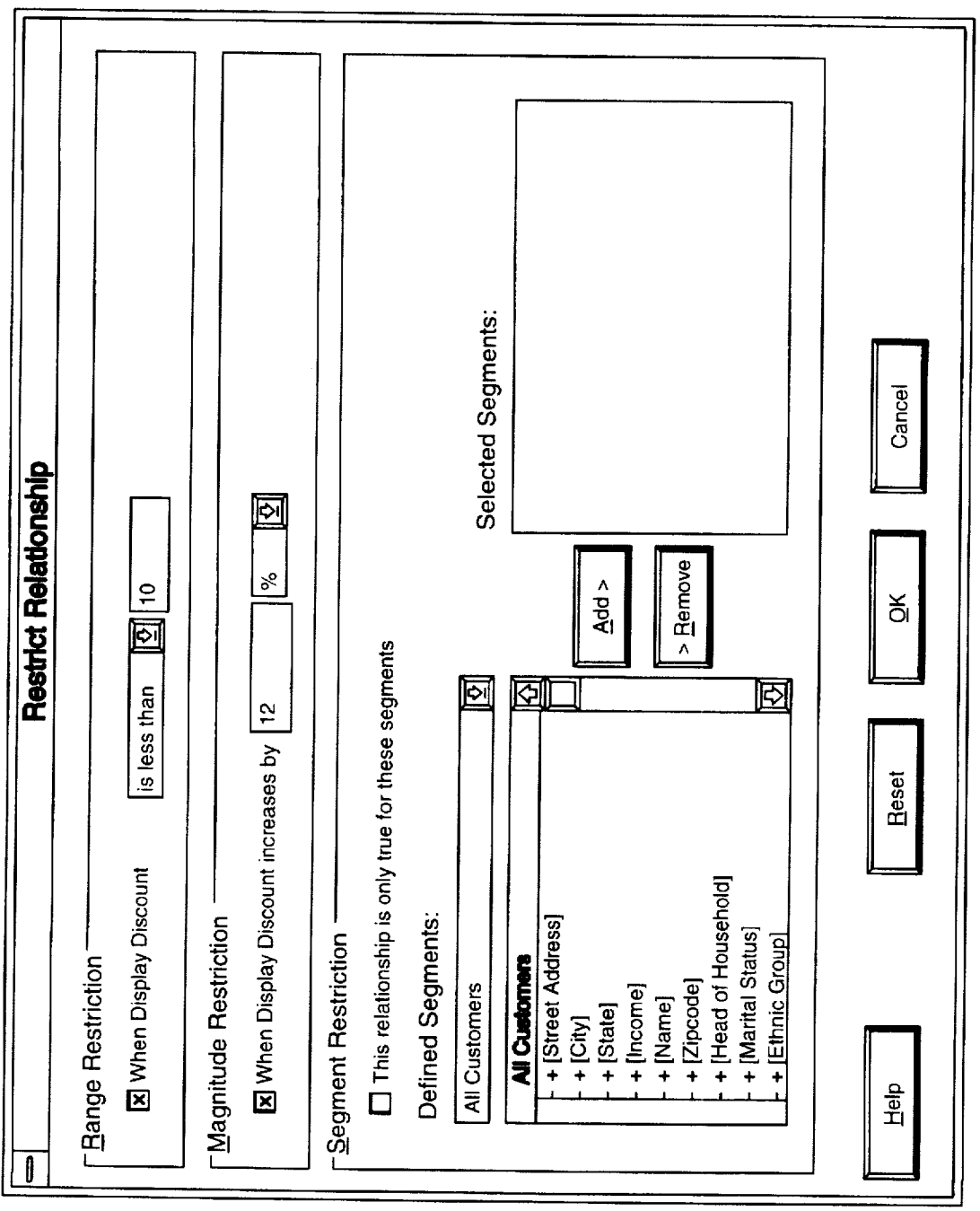

With reference to FIG. 10, Measure relationships may be defined and modified within the Measure Relations divider of the Business Information Setup window 132. Measure relationships are defined in terms of an if-then statement. A primary measure and whether it increases or decreases is selected in the Measure field, which represents the "If" part of the If-Then statement. Measures within the Unrelated field may be moved to either the Decreases field or the Increases field to form the "Then" part of the If-Then statement. With respect to FIG. 11, measure relationships may be restricted by means of the window 132 of that figure.

A batch of InfoFrames may be individually scheduled for automatic production. Scheduling of InfoFrames is particularly useful to those users that require periodic InfoFrames. InfoFrame time intervals may be selected under the Time Interval field, which provides daily, weekly, and monthly reporting options.

With reference to FIG. 12, a sample InfoFrame is shown within Analysis window 136. The type of analysis performed is indicated in the InfoFrame and in the title bar as "Change Analysis". The Segment (previously defined within the Segments divider of the Business Information Setup window 132) is "Store Ages Greater than 3 Years". The Measure (previously define within the Measures divider of the Business Information Setup window 132) is "Same Store Sales". The Time Slice (previously defined in the Time Slice Considered fields of the Analyst Builder window 130) is "Year to date 1995 vs. Last Year".

The InfoFrame provides a concise statement of changes that have occurred in the Primary Measure, Same Store Sales, and changes that have occurred in Measures related to the Same Store Sales, Stores Remodeled, and previously defined within the Measure Relations divider of the Business Information Setup window 132. The InfoFrame then contains an explanation, including a graph, for the change in the Primary Measure, Same Store Sales.

InfoFrame may include multiple instances of HTML associated with a Measure, representing hyperlinks to text data or graphic data representing the results of the Measure.

Figure 13:
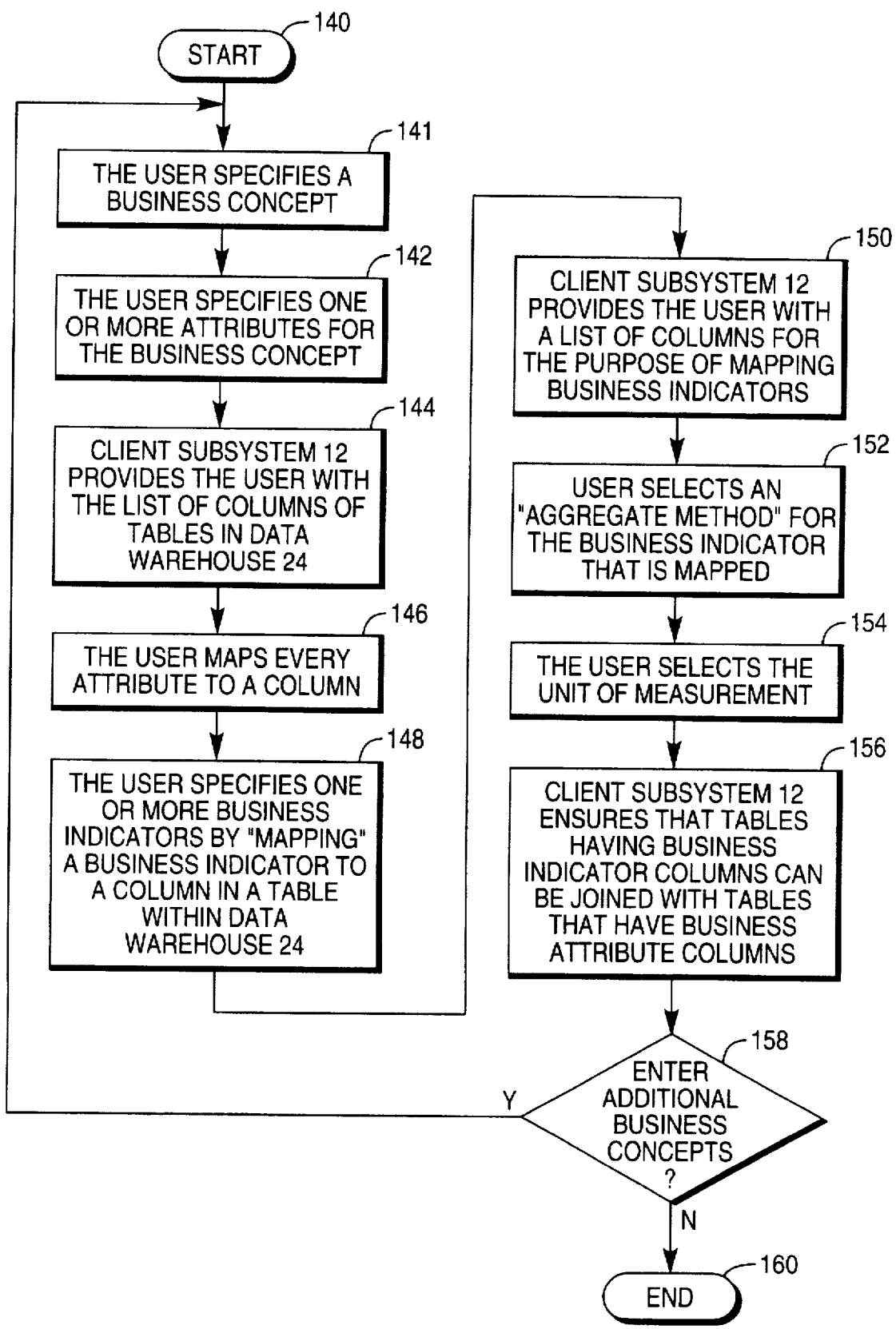
FIG. 13 is a flow diagram illustrating how metadata is created.

Turning now to FIG. 13, a method for creating metadata 25 using client subsystem 12 is illustrated beginning with START 140.

In step 141, the user specifies a Business Concept.

In step 142, the user specifies on e or more attributes for the Business Concept.

In step 144, client subsystem 12 provides the user with the list of columns of tables in data warehouse 24.

In step 146, the user maps every attribute to a column. The user can provide a textual description of the business concepts and the attributes.

In step 148, the user specifies one or more Business indicators by "mapping" a Business Indicator to a column in a table within data warehouse 24.

In step 150, client subsystem 12 provides the user with a list of columns for the purpose of mapping Business Indicators as well.

In step 152, user selects an "aggregate method" for the Business Indicator that is mapped, which specifies how values for the Business Indicator are aggregated. The system supports the following aggregate methods:

Add
Average
Min
Max
Count
Last in period
First in period

In step 154, the user selects the unit of measurement, and specifies whether the Business Indicator is a currency. The user can optionally specify a plural form of the Business Indicator, a verb to describe change in the value of the Business Indicator, the precision for reporting the Business Indicator and a textual description of the Business Indicator.

In step 156, client subsystem 12 ensures that tables having Business Indicator columns can be joined with tables that have Business Attribute columns.

In step 158, client subsystem 12 determines whether the user wishes to enter additional Business Concepts. If so, the method returns to step 142. If not, the method ends at step 160.

The preceding description forms an overview of the present invention, and further detail is provided in U.S. patent application Ser. No. 08/742,006, filed Oct. 31, 1996, and entitled "System And Method For Performing Intelligent Analysis of a Computer Database", and U.S. patent application Ser. No. 08/742,007, filed Oct. 31, 1996, and entitled "System and Method For Segmenting a Database Based Upon Data Attributes", both assigned to NCR Corporation, also the assignee of the present invention and patent application. U.S. patent application Ser. No. 08/742,006 and U.S. patent application Ser. No. 08/742,007 are both incorporated herein by reference thereto. The following sections describe the invention in further detail, broken into further sections.

2. HTML Graphical Reporting Extensions

The HTML graphical reporting extension aspect of the present invention will now be described. For purposes of this description, reference will be made to the management discovery tool system previously described. However, a person of ordinary skill in the art will ready recognize that the HTML extensions taught by the present invention may be applied to any situation where graphs, or analogous graphical images, need to be transmitted from one computer to another.

Figure 14:
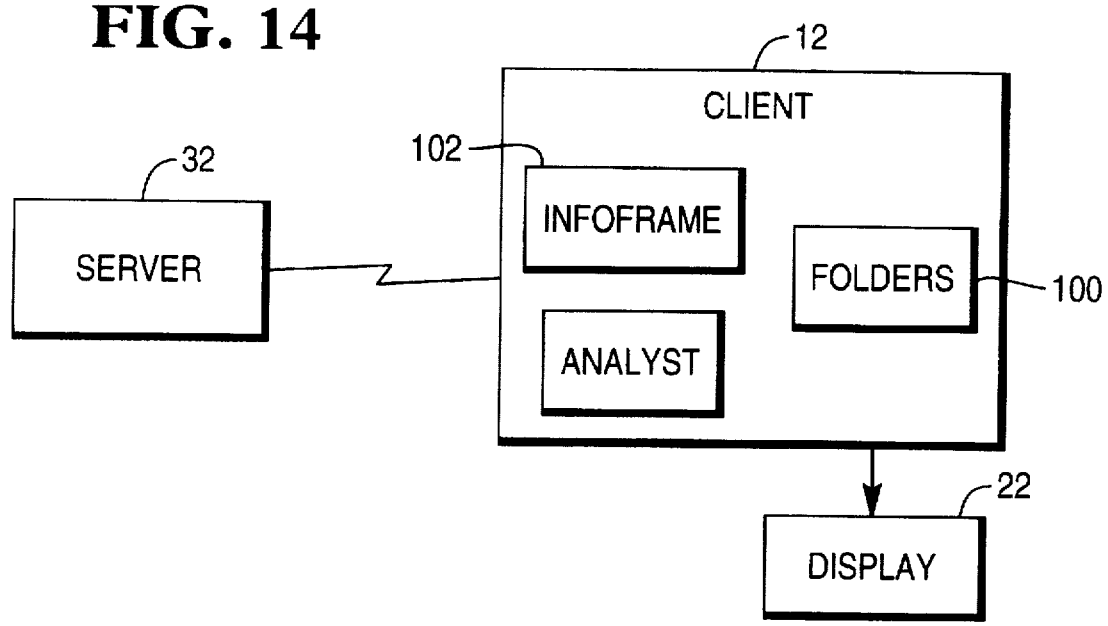
FIG. 14 is a block diagram of the system in accordance with the teachings of this invention.

Referring now to FIG. 14, system 10 is used for transmitting and displaying a graph. It includes a server computer 32 connected to a client computer 12 by a network. The client computer 12 has an an InfoFrame List 102 and Folders 100.

The client 12 defines the type of InfoFrame to request from the server 32, which is then stored within the InfoFrame list 102. An InfoFrame request is sent from the client 12 to the server 32. The server 32 generates HyperText Markup Language (HTML) with graph elements representative of a graph to be displayed and sends it to the client 12. The client 12 stores the InfoFrame received in a specified folder 100.

The graph elements are not HTML standard tags, but an extension of HTML tags. The extended graph tags include <GRAPH>, </GRAPH>, <XLABELS>, <YLABELS>, <GDATA> and </GDATA>.

The <GRAPH> tag indicates the beginning of a graph section. The tag </GRAPH> indicates the close of the graph section. Within the <GRAPH> and </GRAPH> tags the permitted attributes include GRAPH_TYPE, GRAPH_DIMENSION, BAR_NUMBER, GRID, LEGEND and SHOW_DATA_VALUE. Additional attributes may also readily be defined, but these attributes are defined for exemplary purposes.

The attribute GRAPH_TYPE indicates the type of graph. Valid values for this attribute include HORIZONTAL_BAR, VERTICAL_BAR, PIE_CHART, LINE, or 100_PERCENT_BAR_CHART. The attribute GRAPH_DIMENSION indicates whether the graph is one, two or three dimensions. For example, a PIE_CHART may be a one dimensional or a three dimensional graph. The attribute BAR_NUMBER indicates the number of bars or lines to be displayed on the graph. GRID is a flag attribute that indicates whether a grid is to be shown. LEGEND includes a short explanation for each row or column. SHOW_DATA_VALUE is a flag indicative whether a value should be shown for each row or column.

The tag <XLABELS> is the label for the X axis. The tag <YLABELS> is the label for the Y axis. The tags <GDATA> and </GDATA> indicate the beginning and the end of the graph data section. Each data section contains numbers of <XELE>, the x coordinate, and <YELE>, the y coordinate.

The grammar for the graph elements described above follows. The items in bold are constant strings. The items not in bold are variables that are further defined in the grammar. For example, the graph elements start with the grammar string "GRAPH_BEGIN, LABELS, GDATA, </GRAPH>". The variables GRAPH_BEGIN, LABELS and GDATA are further defined. GRAPH_BEGIN is defined to be a string of "<GRAPH, GRAPH_STYLE>" with GRAPH_STYLE further defined to be "GRAPH_STYLE1, GRAPH_STYLE2, GRAPH_STYLE3, GRAPH_STYLE4, GRAPH_STYLE4, GRAPH_STYLE5, GRAPH_STYLE6". GRAPH_STYLE1 is further defined to be "GRAPH_TYPE, EQUAL, GRAPH_VALUE1". GRAPH_VALUE1 is defined to be a "HORIZONTAL_BAR or a VERTICAL BAR or a PIE_CHART or LINE or 100_PERCENT_BAR_CHART".

Below is the grammar rules for the creation of graph elements.

```
GRAPH -->              GRAPH_BEGIN, LABELS, GDATA, </GRAPH>
GRAPH_BEGIN-->         <GRAPH, GRAPH_STYLE, >
GRAPH STYLE -->        GRAPH_STYLE1, GRAPH_STYLE2, GRAPH_STYLE3,
                       GRAPH_STYLE4, GRAPH_STYLE5, GRAPH_STYLE6
GRAPH_STYLE1 -->       GRAPH_TYPE, EQUAL, GRAPH_VALUE1
GRAPH_VALUE1 -->       HORIZONTAL_BAR|VERTICAL_BAR|
PIE_CHART|LINE|
                       100_PERCENT_BAR_CHART
GRAPH_STYLE2 -->       GRAPH_DIMENSION, EQUAL, NUMBERS
GRAPH_STYLE3 -->       BAR_NUMBER, EQUAL, NUMBERS2
GRAPH_STYLE4 -->       GRID, EQUAL, TRUE|FALSE
GRAPH_STYLE5 -->       LEGEND, EQUAL, TRUE|FALSE
GRAPH_STYLE6 -->       SHOW_DATA_VALUE, EQUAL, TRUE|FALSE
NUMBERS -->            1|2|3
NUMBERS2 -->           1|2|3|4|5
EQUAL -->              =
LABELS -->             <XLABEL><YLABEL>, TEXT
                       |LABELS
GDATA -->              <GDATA>, XELEMENT, YELEMENT,</GDATA>
                       |GDATA
XELEMENT -->           <XELE>, DOUBLED NUMBER
                       |XELEMENT
YELEMENT -->           <YELE>, TEXT
                       |YELEMENT
DOUBLED NUMBER --> double
TEXT -->               strings
```

Examples of graph elements created by the server 32 and sent to the client 12 are described below with respect to FIGS. 15–19. The numbers in [brackets] to the left of the graph elements refer to reference numerals in the figures, and do not necessarily form a part of the HTML code.

A. Graph Elements for a Horizontal_Bar graph x-coordinates of 18 and 30.6. The second bar 1518 is labeled "1 year old" with x-coordinates 27.1 and 38.6. The third bar 1520 is labeled ">9 months" with x-coordinates 60 and 34.6. The fourth bar 1522 is labeld ">6 months" with x-coordinates of 20.1 and 34.6. The fifth bar is labeled "<6 months" with x-coordinates of 35 and 62. The graph element definition for the graph shown in FIG. 15 follows.

```
<GRAPH GRAPH_TYPE= HORIZONTAL_BAR GRAPH_DIMENSION=3
BAR_NUMBER=2
GRID=TRUE LEGEND=TRUE SHOW_DATA_VALUE=FALSE>
[1512] <GTITLE>Same Store Sales</GTITLE>
[1514] <XLABEL>Dollars (MM)
[1516] <GDATA><YELE>Not Remodel<XELE>18<XELE>30.6</GDATA>
[1518] <GDATA><YELE>1 year old<XELE>27.1<XELE>38.6</GDATA>
[1520] <GDATA><YELE>>months<XELE>60<XELE>34.6</GDATA>
[1522] <GDATA><YELE>>6 months<XELE>20.1<XELE>34.6</GDATA>
[1524] <GDATA><YELE><  6 months<XELE>35<XELE>62</GDATA>
```

Figure 15:
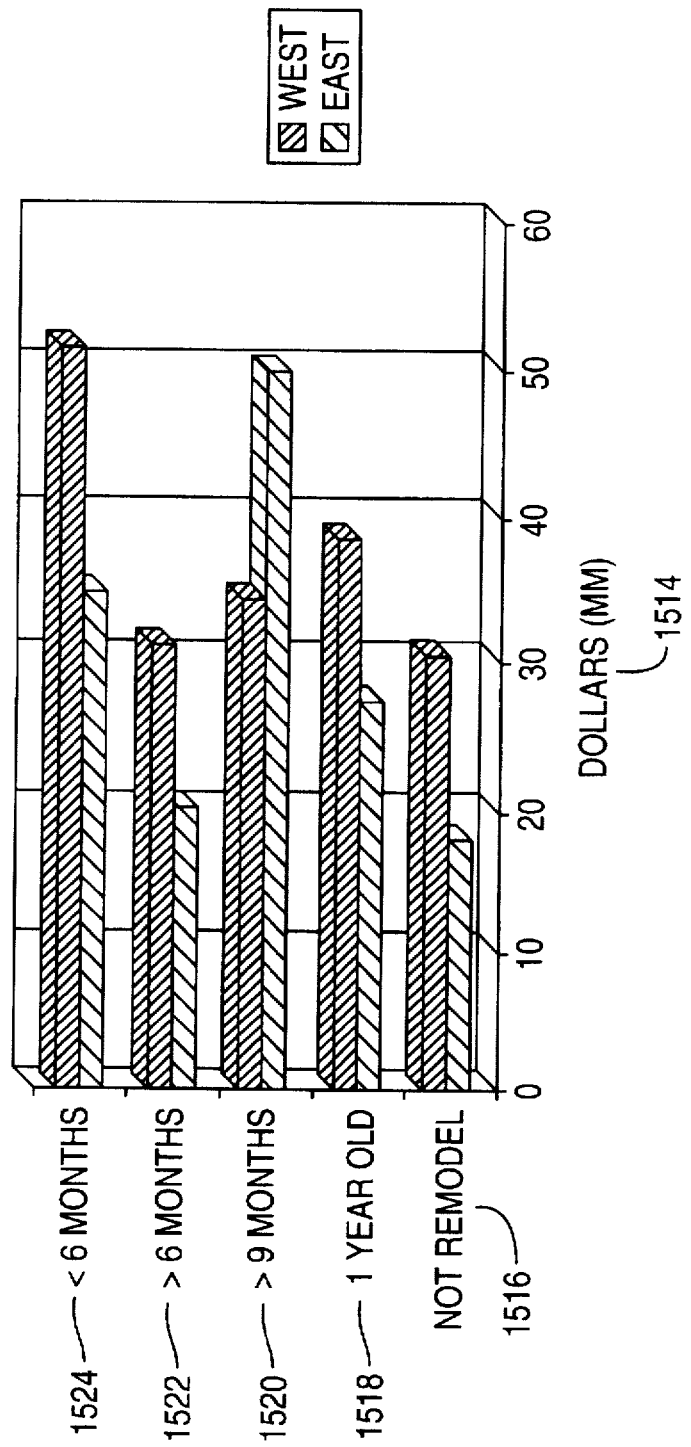
FIG. 15 is a visual representation of a horizontal bar graph.

The horizontal bar graph defined below is shown in FIG. 15. The tag <GRAPH denotes the beginning of the graph. The graph is a three dimensional horizontal bar graph. BAR_NUMBER is set to 2 so two bars will be shown for comparison. The grid and legend of the graph are set to TRUE and hence they will be displayed. No data values on the bars will be shown since SHOW_DATA_VALUE is set to false.

B. Graph Elements for a Vertical_Bar graph

Figure 16:
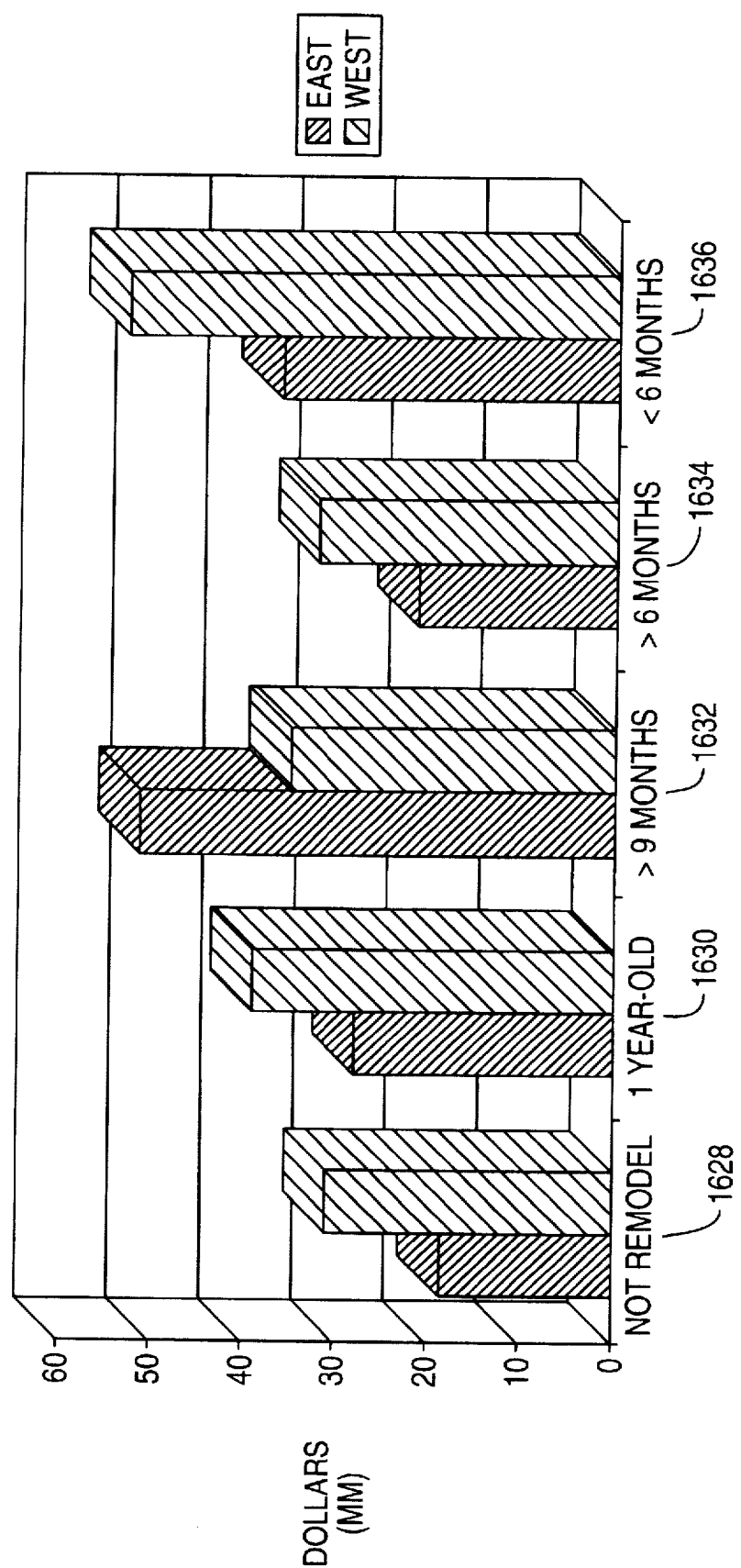
FIG. 16 is a visual representation of a vertical bar graph.

The vertical bar graph defined below is shown in FIG. 16. Again, reference numerals in [brackets] refer to reference numerals in FIG. 16, and are not necessarily part of the HTML code.

```
<GRAPH GRAPH_TYPE= VERTICAL_BAR GRAPH_DIMENSION=3
BAR_NUMBER=2
GRID=TRUE LEGEND=TRUE SHOW_DATA_VALUE=FALSE>
[1626] <GTITLE>Same Store Sales</GTITLE><YLABEL>Dollars (MM)
[1628] <GDATA><XELE>Not Remodel<YELE>18<YELE>30.6</GDATA>
[1630] <GDATA><XELE>1 year old<YELE>27.1<YELE>38.6</GDATA>
[1632] <GDATA><XELE>/>9 months<YELE>60<YELE>34.6</GDATA>
[1634] <GDATA><XELE>/>6 months<YELE>20.1<YELE>34.6</GDATA>
[1636] <GDATA><XELE>/< 6 months<YELE>35<YELE>62</GDATA>
```

Figure 17:
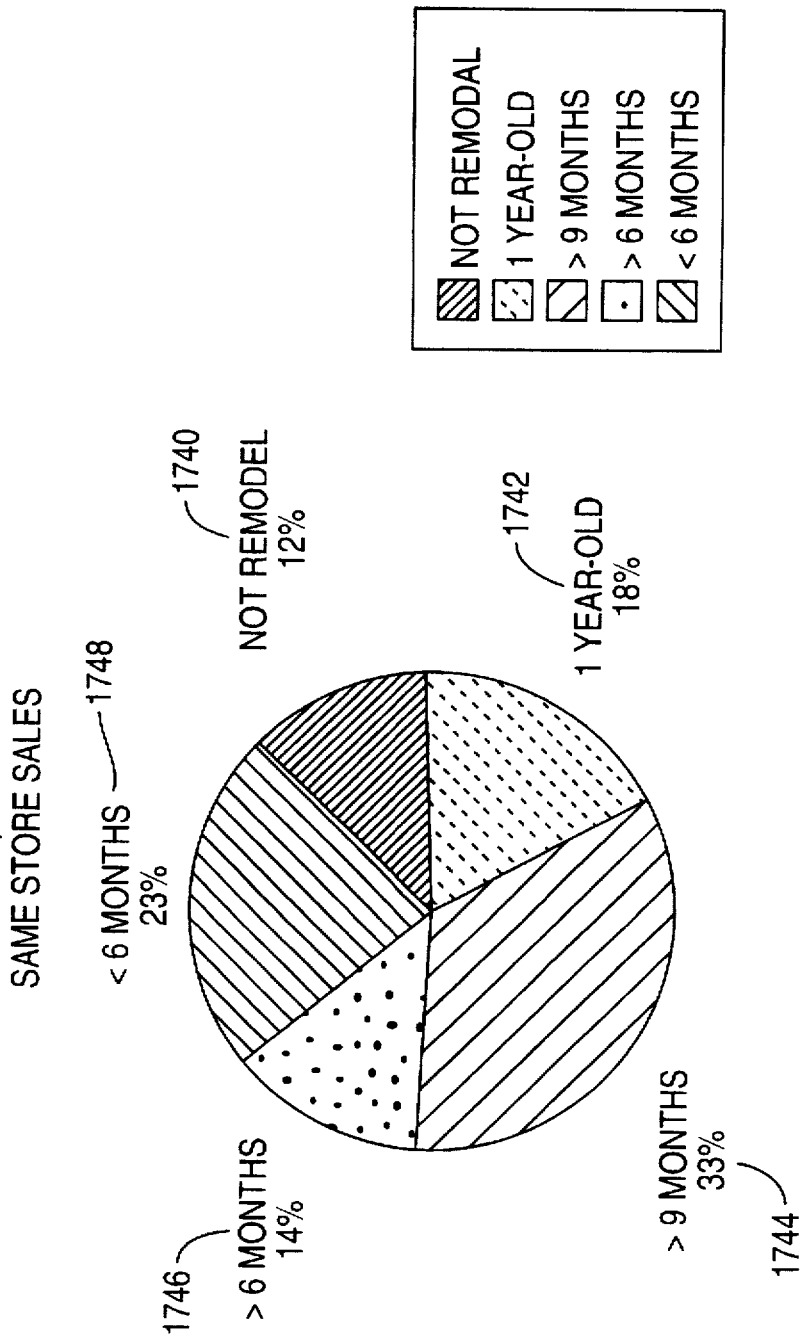
FIG. 17 is a visual representation of a pie chart graph.

The title of the graph, shown by element 1512, is "Same Store Sales". The x-axis 1514 is labeled "Dollars (MM). The graph data starts with the tag <GDATA>. The first bar from the bottom of the graph 1516 is labeled "Not Remodel" with C. Graph Elements for a Pie Chart The pie chart defined below is shown in FIG. 17. Again, reference numerals in [brackets] refer to reference numerals in FIG. 17, and are not part of the HTML code.

```
<GRAPH GRAPH_TYPE= VERTICAL_BAR GRAPH_DIMENSION=1
BAR_NUMBER=0
GRID=TRUE LEGEND=TRUE SHOW_DATA_VALUE=TRUE>
[1738] <GTITLE>Same Store Sales</GTITLE><YLABEL>Dollars (MM)
[1740] <GDATA><XELE>Not Remodel<YELE>18<YELE>30.6</GDATA>
[1742] <GDATA><XELE>1 year old<YELE>27.1<YELE>38.6</GDATA>
[1744] <GDATA><XELE/>9 months<YELE>60<YELE>34.6</GDATA>
[1746] <GDATA><XELE/>6 months<YELE>20.1<YELE>34.6</GDATA>
[1748] <GDATA><XELE/< 6 months<YELE>35<YELE>62</GDATA>
``` a) Graph Elements for a Line Chart Graph

Figure 18:
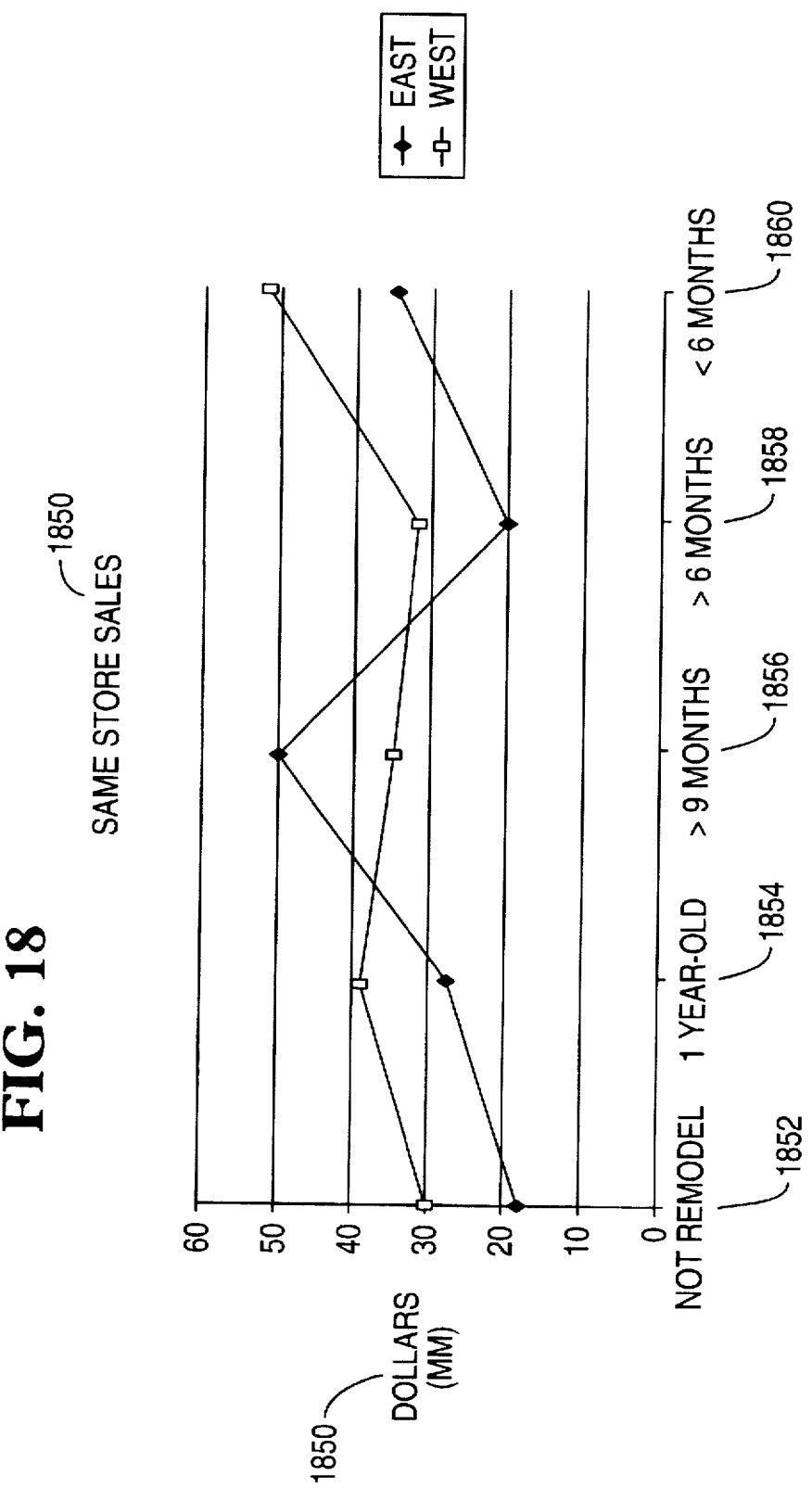
FIG. 18 is a visual representation of a line chart graph.

The line chart graph defined below is shown in FIG. 18. Again, reference numerals in [brackets] refer to reference numerals in FIG. 18, and are not part of the HTML code.

```
<GRAPH GRAPH TYPE= HORIZONTAL_BAR GRAPH_DIMENSION=3
BAR_NUMBER=2
GRID=TRUE LEGEND=TRUE SHOW_DATA_VALUE=FALSE>
[1850] <GTITLE>Same Store Sales</GTITLE><XLABEL>Dollars (MM)
[1852] <GDATA><YELE>Not Remodel<XELE>18<XELE>30.6</GDATA>
[1854] <GDATA><YELE>1 year old<XELE>27.1<XELE>38.6</GDATA>
[1856] <GDATA><YELE/>9 months<XELE>60<XELE>34.6</GDATA>
[1858] <GDATA><YELE/>6 months<XELE>20.1<XELE>34.6</GDATA>
[1860] <GDATA><YELE/< 6 months<XELE>35<XELE>62</GDATA>
```

E. Graph Elements for a 100_PERCENT_BAR_CHART Graph

Figure 19:
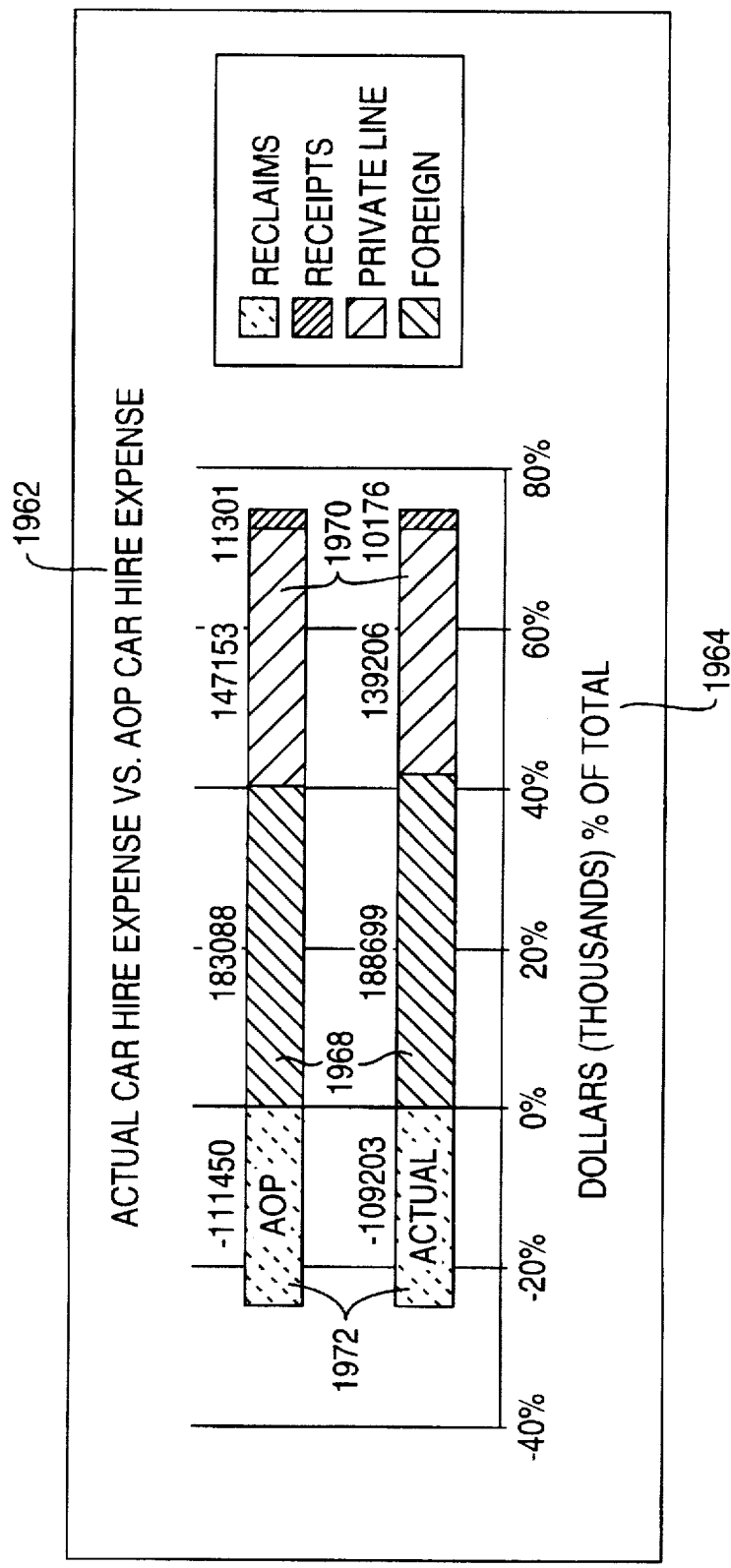
FIG. 19 is a visual representation of a percent bar graph.

The percent bar graph defined below is shown in FIG. 19. Again, reference numerals in [brackets] refer to reference numerals in FIG. 19, and are not part of the HTML code.

```
<GRAPH GRAPH TYPE= 100_PERCENT_BAR CHART GRAPH_DIMENSION=2
BAR_NUMBER=2 GRID=TRUE LEGEND=TRUE SHOW_DATA_VALUE=TRUE>
[1962] <GTITLE> Actual Car Hire Expense vs. AOP Car Hire
Expense </GTITLE>
[1964] <XLABEL>Dollars(Thousands ) % of Total <YLABEL> AOP
<YLABEL> Actual
[1966] <GDATA><YELE>-111450<YELE>-1009203<XELE></GDATA>
[1968] <GDATA><YELE>183988<YELE>188699XELE></GDATA>
[1970] <GDATA><YELE>147153<XELE>139206<XELE></GDATA>
[1972] <GDATA><YELE>11301<XELE>10176<XELE></GDATA>
```

Figure 20:
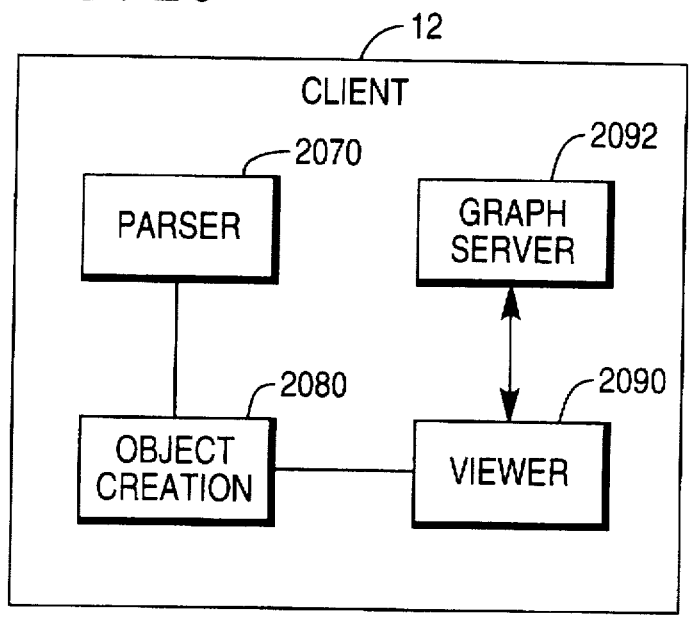
FIG. 20 is a block diagram of the sequence of events performed by the client to display a graph.

As shown in FIG. 20, the client 12 generates a graph by first running a parser 2070 to parse the graph elements received by client 12 (from the server 32) into graph attributes and graph data. Again, graph attributes include GRAPH_TYPE, GRAPH DIMENSION, BAR_NUMBER, GRID, LEGEND and SHOW_DATA_VALUE. Graph data includes the data to be displayed which is denoted by the <GDATA> and </GDATA> tags. After the graph elements are parsed into attributes and graph data, the client 12 creates an object 2080 and the attributes and the graph data are copied to the object. The client 12 then executes a viewer 2090 which calls the graph server 2092 passing it the object representative of the graph to display.

The data structure to hold the graph elements received by the client 12 (from the server 32) may be as follows:

```
class CGraphClass : public CObject{
    public: friend class clnt_Parserview;
    protected:
    clnt_viewGraph ( );
    ~clnt_viewGraph ( );
```

```
-continued private:
Cgraph*                       m_CGraph;
        Cstring       m_graphType;
        in            m_graphDimension;
        int           m_numOfpoints;
        int           m_numOfGroups;
        Cstring       m_showDataLabel;
        Cstring       m_showGrid;
        Cstring       m_showLegend;
        Cstring       m_graphTitle;
        CstringList   m_dataLabelText;
        CstringList   m_legendText;
        CstringList   m_labelText;
        CstringList   m_graphData;
        Cstring       m_bottomTitle;
    int           m_graphwidth;
    int           m_graphHeight;
};
```

Figure 21:
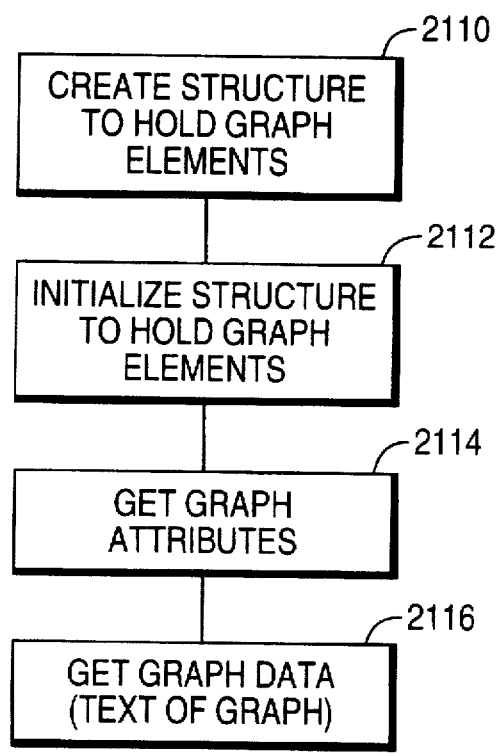
FIG. 21 is a flowchart depicting the high-level steps that may be performed when parsing the graph elements.
Figure 22:
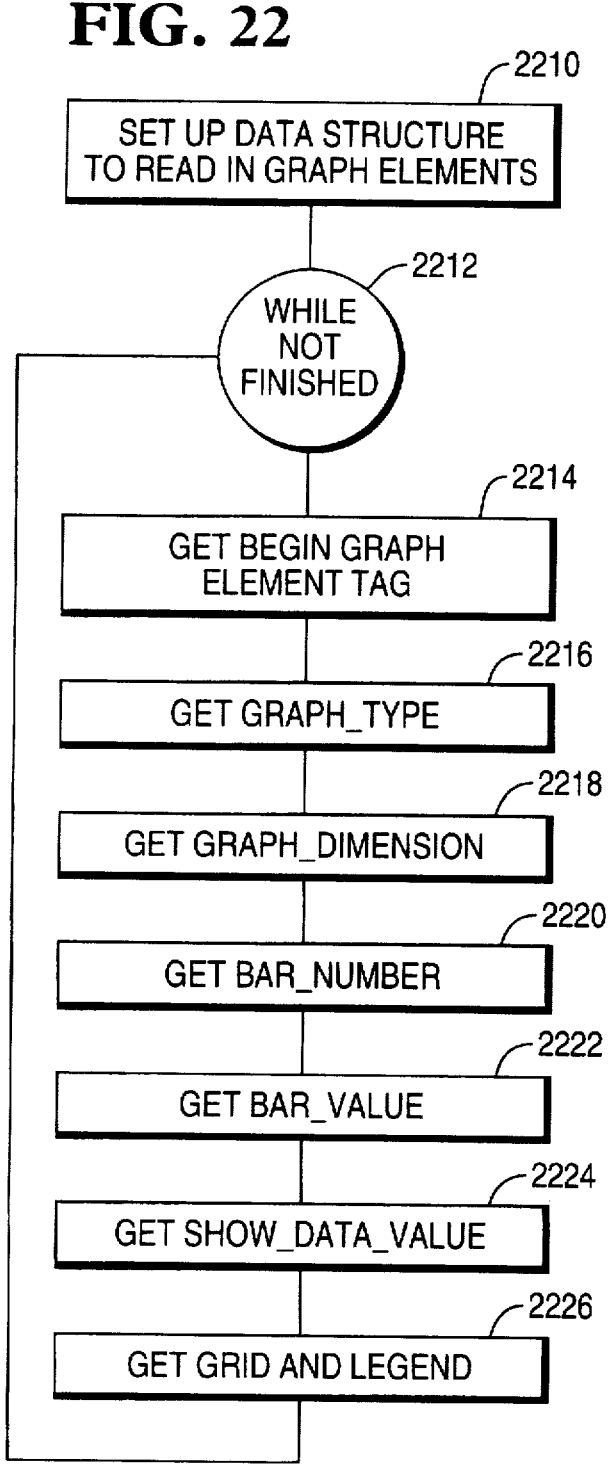
FIG. 22 is a flowchart depicting the parsing of the graph attributes.
Figure 23:
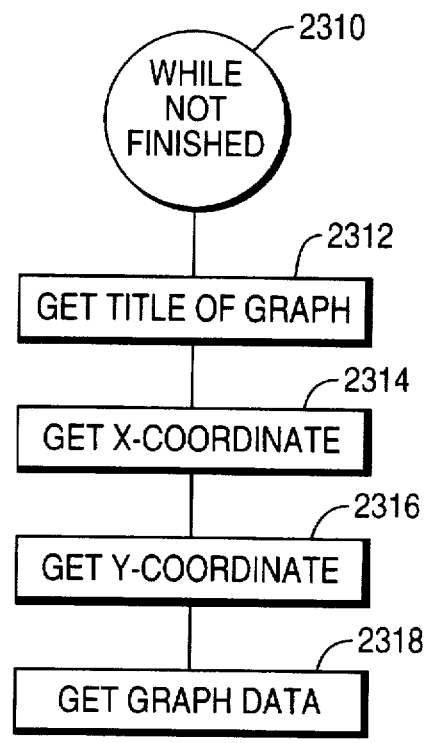
FIG. 23 is a flowchart depicting the parsing of the graph data.

The client 12 may create a CgraphClass instance to hold the graph elements received. The elements are parsed into attributes and graph data and kept in the CgraphClass instance. Code to parse the graph elements into a Cgraph- Class instance is shown below with reference to FIGS. 21-23. Numerals in [brackets] to the left of the code below correspond to the reference numerals used in the the figures.

```
//This function creates a CGraphClass instance in the viewer
to hold the graph data
CGraphClass * Viewer::CreateViewGraph(tag* graph_tag)
{
[2120]  m_pGraph = new CgraphClass( ); /* Creation of
m_pGraph */
[2112]  m_parsedGraphsList.AddTail (m_pGraph);
[2112]  POSITION pos = graph_tag-
>m_objectList.GetHeadPosition( );
[2114]  GetGraphAttr(graph_tag, m_pGraph);
     //get attributes and values from the tag and then set
the
     //m_pGraph properties
[2310]  while ( pos != NULL ) {
          clnt_Tag * html_tag =
              (clnt_Tag*) graph_tag-
m_objectList.GetNext (pos);
[2312]    if (AreTheseTagsSame(html_tag—>m_beginTag,
          (Cstring)GTITLE_BEGIN )) {
          m_pGraph—>m_graphTitle =
GetGraphStrings (html_tag);
          }
[2314]    else if (AreTheseTagsSame(html_tag—>m_beginTag,
          (Cstring) XLABEL )) {
          m_pGraph—>m_bottomTitle =
GetGraphstrings (html_tag);
          }
[2316]    else if (AreTheseTagsSame(html_tag—>m_beginTag,
          (Cstring) YLABEL )) {
          m_pGraph—>m_legendText.AddTail
              (GetGraphStrings (html_tag));
          }
[2318]    else if (AreTheseTagsSame(html_tag—>m_beginTag,
          (Cstring) GDATA_BEGIN ))
              m_pGraph—>m_numOfPoints++;
          POSITION pos1 =
          html_tag—>m_objectList.GetHeadposition( );
          while ( pos1 != NULL )  //for each row {
          clnt_Tag * dataElements =
          (clnt_Tag*)
              html_tag—>m_objectList.GetNext (pos1);
          if (AreTheseTagsSame (dataElements—
>m_beginTag,
              (Cstring) XELE )) {
              m_pGraph—>m_graphData.AddTail(
              GetGraphStrings (dataElements));
              }
              else if (AreTheseTagsSame
              (dataElements—>m_beginTag, (CString) YELE )) {
              m_pGraph—>m_labelText.AddTail(
              GetGraphStrings (dataElements));
              }
          } /*while*/
          } /*else if */
     } /*while */
     return m_pGraph;
}
//Get the Graph attributes such as GRAPH_TYPE,
GRAPH_DIMENTION, and
//their values
void Viewer::GetGraphAttr (tag * garphTag, CGraphClass *
pGraph)
{
     POSITION pos1;
     CString attr, value;
     int numOfAttr = graphTag—>m_styleList.GetCount( );
     if (numOfAttr >0)
     {
[2210]  pos1 = graphTag—>m_styleList.GetHeadPosition( );
[2212]  while ( pos1 != NULL )
          {
[2214]      style_struct* styleValuePair =
              (style_struct*) graphTag—
>m_styleList.GetNext (pos1) ;
              styleValuePair—>getStyleValue(attr,value) ;
              IdGraphAttr(attr,value, pGraph) ;
```

```
          }
     }
     return ;
}
//Identify the attributes of graph tag and then set the
corresponding
//properties in the CGraph object
void Viewer::IdGraphAttr(CString attr,CString
value,CGraphClass * pGraph)
{
[2216]  if (AreTheseTagsSame (attr, (CString) GRAPH_TYPE )) {
          pGraph—>m_graphType '2 value;    //default is
vertical
          }
[2218]  else if (AreTheseTagsSame (attr, (CString)
GRAPH_DIMENSION )) {
          pGraph—m_graphDimension = _ttoi (value);
          }
[2220]  else if (AreTheseTagsSame (attr, (CSring)
BAR_NUMBER )) {    pGraph—>m_numOfGroups =
_ttoi (value);
[2222]  else if (AreTheseTagsSame (attr, (CString) BAR_VALUE
)) {
          pGraph—>m_showDataLabel = value;
          }
[2224]  else if (AreTheseTagsSame (attr, (CString)
SHOW_DATA_VALUE )) {
          pGraph—>m_showDataLabel = value;
          }
[2226]  else if (AreTheseTagsSame (attr, (CString) GRID )) {
          pGraph—>m_ShowGrid = value;
[2228]  else if (AreTheseTagsSame (attr, (CString) LEGEND
)) {
          pGraph—>m_showLegend = value;
          }
     return ;
}
```

After the graph elements are parsed and placed in the instance of CgraphClass, m_pGraph, the client 12 creates an object to send to the graph server 2092. For example, in the code below the object is m_CGraph which is an instance of Cgraph. The parsed data from m_pGraph is moved to the object m_CGraph.

Figure 24:
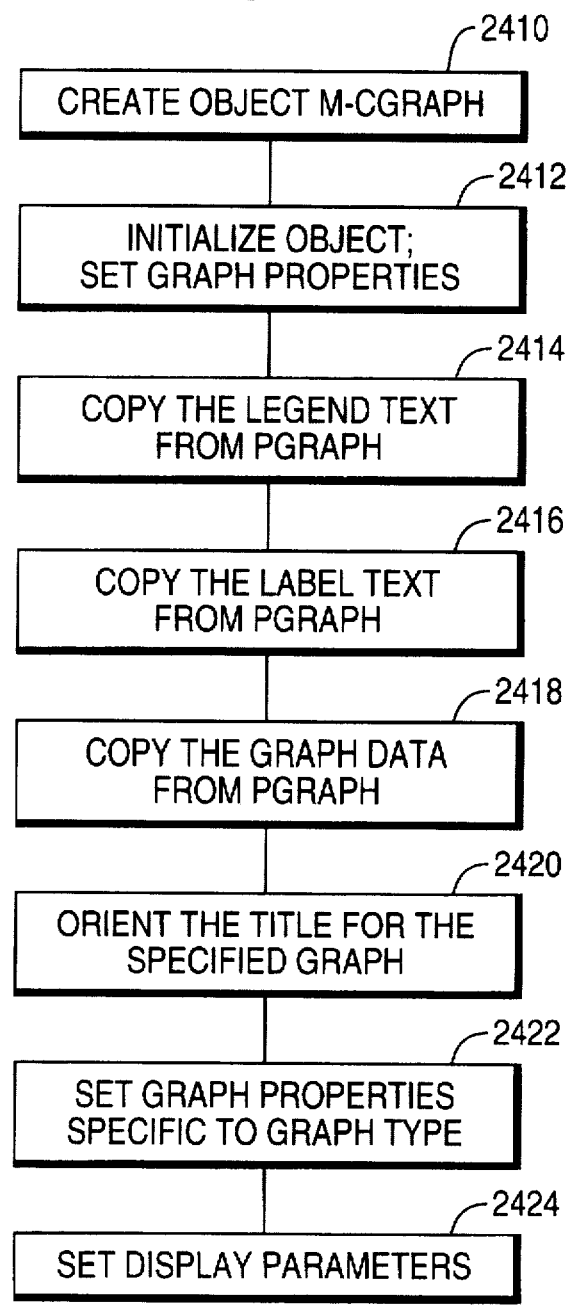
FIG. 24 is a flowchart depicting the creation of an object to send to the graph server.

An example of code that will initialize the object m_CGraph is as follows. Again, numerals in [brackets] to the left of the code below correspond to the reference numerals used in FIG. 24.

After the graph structure m_CGraph is initialized, it is sent to the graph server 2092 to display the graph. A graph server 2092 that may be used is the Graphics Server produced and distributed by Pinnacle Publishing, Inc. In addition, if the graph elements received by the client 12 are converted to standard HTML formats, the graph displayed by the graph server 2092 may be converted to GIF format (or equivalent format) using an image converter. In the GIF format, since the graph is essentially a bit map display, the graph may be viewed by any browser with bit-map viewing capabilities.

Although the present invention has been described with particular reference to certain preferred embodiments thereof, variations and modifications of the present invention can be effected within the spirit and scope of the following claims.

What is claimed is:

1. A system for displaying a graph on a computer system comprising:
   (a) a network for connecting a plurality of computer systems;
   (b) a server computer system comprising:
      (i) means for selecting a graph type from a plurality of available graph types;

(ii) means for generating graph elements representative of attributes of the selected graph type;

(iii) means for transmitting the graph type and the graph elements onto the network;

(c) a client computer system comprising:

(1) a video display;

(2) means for receiving the graph type and the graph elements from the network;

(3) means for extracting the attributes from the graph elements;

(4) means for extracting graph data from the graph elements;

(5) means for generating an object from the attributes, the object representative of the graph type and the graph elements to be displayed on the video display; and (6) means for displaying the object on the video display.

2. The system of claim 1, wherein the graph elements include a tag and a value.

3. The system of claim 2, wherein the tag is selected from a list of tags comprising: the graph type, the graph dimension, the bar number, the graph legend, and flags indicative of whether a grid or data value should be displayed.

4. The system of claim 1 wherein the extracting means comprises:

(1) a means for storing the graph data;

(2) a means for parsing the graph data into attributes representative of characteristics of the graph.

5. A method for displaying a graph on a computer system comprising the steps of:

(a) networking a server computer system to a client computer system;

(b) selecting a graph type from a plurality of available graph types;

(c) generating graph elements representative of attributes of the selected graph;

(d) transmitting the graph elements from the server computer system to the client computer system;

(e) receiving the graph elements;

(f) extracting the attributes from the graph elements;

(g) extracting the graph data from the graph elements;

(h) generating an object from the attributes, the object representative of the graph elements to be displayed; and (i) displaying the object on a video display associated with the client computer system.

6. The method of claim 5 wherein the step of extracting the attributes from the graph elements comprises the steps of:

(1) detecting a tag within the graph elements;

(2) obtaining the value associated with the tag.

* * * * *